(12) United States Patent
Noorkõiv et al.

(10) Patent No.: US 11,730,296 B2
(45) Date of Patent: Aug. 22, 2023

(54) LOCKING DEVICE AND METHOD FOR A PARCEL BOX

(71) Applicant: Clevon AS, Viljandi (EE)

(72) Inventors: Mikk Noorkõiv, Suure-Jaani parish (EE); Arno Kütt, Viljandi parish (EE); Mikk Mihkel Vaabel, Viljandi (EE); Kaur Ojakivi, Otepää parish (EE); Marek Peterson, Põhja-Sakala parish (EE); Laur Joost, Tartu (EE); Lauri Laanmets, Viljandi (EE)

(73) Assignee: CLEVON AS, Vijandi (EE)

( * ) Notice: Subject to any disclaimer, the term of this patent is extended or adjusted under 35 U.S.C. 154(b) by 497 days.

(21) Appl. No.: 16/787,277

(22) Filed: Feb. 11, 2020

(65) Prior Publication Data

US 2020/0253407 A1 Aug. 13, 2020

Related U.S. Application Data

(60) Provisional application No. 62/804,296, filed on Feb. 12, 2019.

(51) Int. Cl.
*E05B 65/52* (2006.01)
*E05B 47/00* (2006.01)
(Continued)

(52) U.S. Cl.
CPC ............ *A47G 29/141* (2013.01); *E05B 5/006* (2013.01); *E05B 9/02* (2013.01); *E05B 13/002* (2013.01);
(Continued)

(58) Field of Classification Search
CPC .. E05B 1/0015; E05B 2001/0023; E05B 9/02; E05B 13/002; E05B 47/0012;
(Continued)

(56) References Cited

U.S. PATENT DOCUMENTS 5,938,248 A * 8/1999 Vickers ..................... E05B 5/00
292/34
8,145,351 B2 * 3/2012 Schininger .............. G07F 17/12
221/12
(Continued)

FOREIGN PATENT DOCUMENTS

BE 1013597 A3 4/2002
DE 202011004196 U1 * 10/2011 ............. E05C 9/041
EP 2685032 A2 1/2014

*Primary Examiner* — Kristina R Fulton
*Assistant Examiner* — Emily G. Brown
(74) *Attorney, Agent, or Firm* — Meunier Carlin & Curfman LLC

(57) ABSTRACT

Locking device is disclosed for parcel boxes or lockers. The device comprises a user operable handle and a lock mechanism comprising a motor to rotate a pinion to move a rack attached to a handle-blocker and to a deadbolt. The handle-blocker controls transition of the user operable handle between open and closed positions due to movement of the rack, and simultaneously the deadbolt is configured to move between locking and unlocking positions. In the closed position, the handle-blocker and the handle-body have a linear connection with each other and in open position this connection is lost. The handle may be activated by tapping the handle-cover, or by using an RFID, NFC or by mobile technologies. A method to operate opening and closing a parcel box locked with the locking device allows one or more users to access the parcel box via software application paired with the device.

14 Claims, 21 Drawing Sheets

(51) Int. Cl.

| | |
|---|---|
| *E05B 13/00* | (2006.01) |
| *E05B 9/02* | (2006.01) |
| *G07C 9/00* | (2020.01) |
| *G07C 9/27* | (2020.01) |
| *G07C 9/29* | (2020.01) |
| *A47G 29/14* | (2006.01) |
| *E05B 59/00* | (2006.01) |
| *G06K 7/10* | (2006.01) |
| *E05B 5/00* | (2006.01) |

(52) U.S. Cl.
CPC .......... *E05B 47/0012* (2013.01); *E05B 59/00* (2013.01); *E05B 65/5215* (2013.01); *G06K 7/10297* (2013.01); *G06K 7/10366* (2013.01); *G07C 9/00309* (2013.01); *G07C 9/00571* (2013.01); *G07C 9/27* (2020.01); *G07C 9/29* (2020.01); *A47G 2029/147* (2013.01); *A47G 2029/149* (2013.01); *E05B 2047/002* (2013.01); *E05B 2047/0016* (2013.01); *E05B 2047/0068* (2013.01); *G07C 2009/0065* (2013.01); *G07C 2009/0092* (2013.01)

(58) Field of Classification Search
CPC ............... E05B 59/00; E05B 65/5215; E05B 2047/0016; E05B 2047/002; E05B 2047/0067; E05B 2047/0068; E05B 13/005; E05B 65/0075; E05B 65/02; E05B 65/025; E05B 65/06; E05B 5/00–006; E05B 47/026; E05B 47/0603; E05B 2047/0022; E05B 2047/0037; E05B 2047/0094; E05B 7/00; A47G 29/141; A47G 2029/1257; A47G 2029/148; E05C 1/04; E05C 1/06; E05C 1/12; E05C 1/14; E05C 1/15; E05C 1/145; E05C 9/12; E05C 1/00–166; A47B 2095/027; A47B 95/02; Y10T 70/5097; Y10T 70/5111
USPC .......................................................... 292/144
See application file for complete search history.

(56) References Cited

U.S. PATENT DOCUMENTS

| | | | | |
|---|---|---|---|---|
| 8,516,862 | B2 * | 8/2013 | Stuckey | E05B 83/12 |
| | | | | 292/DIG. 31 |
| 10,039,401 | B1 | 8/2018 | Romanucci | |
| 2004/0133304 | A1 | 7/2004 | Fobbe et al. | |
| 2007/0257773 | A1 * | 11/2007 | Hill | E05B 47/0012 |
| | | | | 70/278.1 |
| 2008/0258867 | A1 * | 10/2008 | Harris | E05B 47/026 |
| | | | | 280/5.2 |
| 2012/0169072 | A1 * | 7/2012 | Maguire | G07C 9/00912 |
| | | | | 292/336.3 |
| 2012/0194043 | A1 * | 8/2012 | Turner | G07F 7/00 |
| | | | | 312/109 |
| 2015/0097380 | A1 * | 4/2015 | Nye-Hingston | E05B 63/14 |
| | | | | 292/201 |
| 2016/0060008 | A1 * | 3/2016 | Farentinos | E05B 49/002 |
| | | | | 220/211 |
| 2017/0002586 | A1 * | 1/2017 | Lee | E05B 39/00 |
| 2017/0096846 | A1 * | 4/2017 | Neely, III | E05C 9/02 |
| 2017/0328130 | A1 * | 11/2017 | Baker | E06B 9/80 |
| 2018/0066453 | A1 * | 3/2018 | Dobbins | E05B 15/022 |
| 2018/0179785 | A1 | 6/2018 | Liddell et al. | |
| 2018/0216377 | A1 * | 8/2018 | Tran | E05B 65/0021 |
| 2018/0352988 | A1 * | 12/2018 | Ortiz | A47G 29/20 |
| 2019/0352933 | A1 * | 11/2019 | Tartal | A47G 29/141 |
| 2020/0239207 | A1 * | 7/2020 | Bontempo | E05B 39/005 |
| 2021/0047863 | A1 * | 2/2021 | Kolls | G07C 9/00571 |

\* cited by examiner

LOCKING DEVICE AND METHOD FOR A PARCEL BOX

PRIORITY

This application claims priority of the U.S. provisional patent application No. 62/804,296 filed on Feb. 12, 2019 the contents of which is incorporated herein by reference.

FIELD OF INVENTION

This disclosure relates to self-service parcel boxes and parcel lockers, more specifically to the field of locking parcel boxes or parcel lockers for delivery, storing and receiving parcels, packages and other postal objects securely. A unique locking device and method for parcel boxes is disclosed.

BACKGROUND

Different locking devices and methods for parcel boxes and parcel lockers used in connection with delivery, storing and receiving of parcels, packages and other postal objects are known from the prior art.

Generally, delivery of goods in parcels, packages etc. to end-users such as consumers has become increasingly common during recent times due to vast increase of internet shopping. For example, many consumers order clothes, appliances, furniture and other goods from the internet and wish for direct delivery to their homes or other desired address. Similarly, service businesses, such as laundry businesses pick up and deliver laundry directly to consumers' homes or at another selected address. Also ordering groceries directly to consumers' homes is increasingly popular.

A very important factor is to have the delivery, storing and receiving of parcels, packages and other postal objects operable securely, safely and conveniently at all stages of delivering the parcel to a parcel box, storing it and then receiving it. Taking in account that the consumers cannot always be at home when the goods are delivered, that it is not safe to have the goods to be left at their door unattended or with a neighbor, or to provide the vendor or delivery person with keys to their home.

Thus, in the prior art different types of solutions to these problems have been presented. For example, patent application publication BE1013597 discloses a device for collecting and withdrawing parcels, and a box that is accessible from the road and has coded opening means e.g., a keypad on the door. The code is temporary and can be modified at any time by the owner. Patent application publication US2004133304 discloses an apparatus for receiving ordered products, and/or making products available for pickup without personal transfer to or by the user of the product (reception/provision apparatus) with a lockable container for the products. The system has at least one input device, optionally arranged on or in the container for inputting delivery/pickup information from or to the delivery person or return agent, respectively-A controller is arranged in or on the container, with a memory element for checking the delivery/pickup information input by the delivery person or return agent, respectively. The order information is stored in the memory element. The container is opened if the delivery/pickup information agrees in a predetermined way with the order information, and for an expected delivery/pickup. A control unit comprising at least input means, controller and memory element can be positioned with container in front of or near the user's residence or place of business or the memory element or a part of the control unit containing the memory element can be inserted by the user in the container that is or can be positioned in front of the user's residence or place of business.

Further, patent publication US10039401 discloses a smart parcel safe designed to receive and protect parcels delivered to an owner by a delivery service. The safe comprises an owner-container defining an enclosure with an opening and a lid attached to the owner-container by hinges and formed to fit over the opening and securely close the enclosure in a closed orientation. The lid is hinged to move from the closed orientation into an open orientation so as to provide access to the enclosure through the opening. An electronically controlled locking mechanism is affixed to the owner-container and the lid. The smart parcel safe includes a smart temperature control refrigeration unit attached to the owner-container and is positioned to control temperatures in the owner-container. An owner mobile communication device and a delivery service mobile communication device each include an app designed to remotely control locking/unlocking of the electronically controlled locking mechanism. The electronically controlled locking mechanism is responsive to the app included in the owner mobile communication device and the delivery service mobile communication device so as to be remotely locked/unlocked in response to operation of either the owner mobile communication device or the delivery service mobile communication device, whereby parcels can be securely delivered to the owner via the smart parcel safe by the delivery service.

Also, various types of electronic locking devices for parcel boxes are known from prior art. For example, patent application publication US2018179785 discloses a smart lock for securing a closure. The lock comprises an actuator configured to actuate a lock mechanism contained within the closure to secure and/or to release the lock mechanism and a receiver configured to wirelessly receive a signal to control operation of the actuator. The actuator comprises a prime mover and a drive train for transmitting motion of the prime mover to actuate the lock mechanism. The prime mover is an electric motor. The drive train comprises a thumb turn wheel to allow manual operation of the lock mechanism. The thumb turn wheel comprises a button configured to actuate the lock mechanism contained within the closure to secure the lock mechanism after a predetermined delay period. Patent publication EP2685032 discloses an electronic locking unit for the case of a multiple locking system. The system has a lock which can be attached to the side wall of a body, a frame plate which can be installed on the door leaf side, a door bracket which can be arranged on the door leaf side and a bearing plate. The door bracket engages in the lock and can be locked there. The door leaf-side door bracket is accommodated in the bearing plate which is arranged in a plane vertical to the actuating direction of the door bracket to be floating in the frame plate which can be installed on the door leaf side. A receiving bore for the body-side centering of a contact stud of a contact arranged on the lock side is arranged in the bearing plate mounted to be floating.

A shortcoming of the currently known solutions is that they often have a very complicated structure and configuration. Also, locks of parcel boxes and like known from prior art can typically be used only in one environment. Further, in many cases possibilities of usage in different ways is limited and typically, the person opening the lock of the parcel box or like must be within a short distance from the parcel box and possibilities to give rights to other user by the owner of the parcel box or like are very limited. Another drawback in the known solutions is often that after opening the door of the parcel box there is no means to secure the door is not accidentally left open.

Accordingly, there is a need for a locking device of a parcel box and a method for using such locking device in delivery, storing and receiving a parcel in and/or from the parcel box that would allow remote opening of the parcel box in various and flexible ways of usage.

Accordingly, there is a need for a locking device of a parcel box and method for using such locking device in delivery, storing and receiving a parcel in and/or from the parcel box that has a compact, safe and reliable structure with possibilities for the end customer even to build his/her own parcel box or even integrate to his/her house.

Accordingly, there is a need for a locking device of a parcel box and a method for using such locking device in delivery, storing and receiving a parcel in and/or from the parcel box that would allow the end user to give rights to use the locking device to other parties, for example to a service provider or to neighbors.

Accordingly, there is a need for a locking device of a parcel box and a method for using such locking device in delivery, storing and receiving parcels in and/or from the parcel box that needs no battery changes and/or has an autonomous power source.

Accordingly, there is a need for a locking device of a parcel box and a method for using such locking device in delivery, storing and receiving a parcel in and/or from the parcel box, in which the risk of the door of the parcel box left open is eliminated.

Especially so, as in today's world storage/delivery for all kinds of postal objects, including food and perishables, are used more and more as customers are buying items from internet increasingly often.

SUMMARY OF THE INVENTION

It is an object of this invention to provide a locking device and method to address the flaws in currently existing art.

It is an object of this invention to provide a safe solution for locking parcel boxes or parcel lockers for delivery, storing and receiving parcels, packages and other postal objects securely, especially operable in cases, where there are different types of needs for opening types, in particular also when a need of remote opening exists.

It is yet an object of this invention to provide a device and a method for securely locking parcel boxes or parcel lockers for delivery, storing and receiving parcels, packages and other postal objects.

It is still an object of this invention to provide a locking device (i.e. a lock) for a parcel box, said locking device comprising: two main parts: a lock body, which includes a locking mechanism; and a user operable handle and electronics, wherein the locking mechanism comprises a set of a deadbolt and a handle-blocker, and a rack for locking and unlocking movements of the lock.

It is an object of this invention to provide a locking device for a parcel box comprising: a lock body having a locking mechanism, a user operable handle optionally comprising a handle-cover, and a handle-body, and electronics comprising a rechargeable battery and a lock controller comprising a printed circuit board (PCB)-assembly having elements for controlling the lock; and optionally a front face plate; wherein the locking mechanism comprises a motor configured to rotate a pinion configured to move a rack attached to a set of handle-blocker and deadbolt for locking and unlocking movements, and wherein the handle remains closed when the handle-blocker and the handle-body have a linear connection with each other, and the handle begins to open when the handle-blocker and the handle-body due to movement of the rack loose the linear connection.

It is a further object of this invention to provide a lock body, which comprises a housing with all internal components of the locking device, at least one solar panel as part of the locking device or assembled separately of the locking device, a cellular antenna for data communication, a lock body shell, a lock base part, which has an integrated slide allowing linear movement of a deadbolt, a rack and a handle-blocker, a handle-cover for protecting the cellular antenna, a handle-body, which is a main part of the handle used for opening a door of a compartment or like, in which the locking device is attached to a handle axle, which allows the handle to rotate into open and closed states, a deadbolt as an object in the locking device sliding into a fixed groove or other obstacle to close compartment's or like's door on which the lock device is attached, a handle-blocker which when the lock is in locked state to block rotation of the handle and in opened state the handle-blocker is moving along a rack and a deadbolt thus allowing the handle to move independently from the deadbolt, a rack mounted on the deadbolt, which acts as linear element in the rack, a pinion mechanism, a geared motor, a handle opening torsion spring opening the handle when the handle is not blocked by the handle-blocker, a blocker retraction spring retracting the handle-blocker when external obstruction of the handle movement is removed and moving the handle into its original position, a rechargeable battery for providing load levelling for the system, a lock controller comprising a PCB (printed circuit board) to which an LED (light emitting diode) is connected to, a snap action switch for detecting user input, a switch plunger, which is a mechanical extension of the snap action switch to add weather resistance, and limit switches or a limit switch for detecting limits of the deadbolt's actuation.

It is another object of this invention to provide a locking method for a parcel box comprising a lock, in which method for unlocking the lock a switch on a printed circuit board is activated and a mechanical switch extension is used to add resistance and wherein a lock motor starts to rotate and initiates a rack and pinion-mechanism to drive the rack, a deadbolt and handle-blocker connected thereto into opened position, while the set of deadbolt and handle-blocker, and the rack are sliding in a linear or parallel contact keeping the handle closed, and when the set continues to move in opening position direction the linear contact of the handle-blocker and the handle-body is lost the handle starts to rotate into open position by the force of a torsion spring, and the set of the deadbolt, the handle-blocker and the rack stops at an open position and the lock is in unlocked position.

It is another object of this invention to provide a locking method for a parcel box comprising a lock, in which method for locking the lock, the door to which the lock is attached is closed by a user and the closed state of the door is detected by a sensor inside the lock and while the door is kept in a closed position, the set of a deadbolt and a handle-blocker, and a rack starts to move into a locked position, the handle-body starts to rotate into closed position by the linear movement of the handle-blocker and while the rack and the deadbolt are fixed to each other, the handle-blocker slides in the direction of the movement of the set of the deadbolt and the handle-blocker, and the rack allowing the movement of the deadbolt into the locked position while movement of the handle is blocked by user or other circumstance.

It is yet another object of this invention to provide a locking method wherein when external blocking of the handle is removed, the handle closes by force of a spring connected to the set of the deadbolt and the handle-blocker, the handle-body stops at closed position and the handle is closed and cannot be opened manually while handle-blocker is blocking it.

It is a further object of the invention to provide a method to operate opening and closing a parcel box lockable with a lock as described here, the method comprising the steps of: a) an end-user having an end-user software application opening an account on the software for the lock; b) the end-user pairing the lock with one or more users having a user software application; c) providing a first mode recognizing a user having the software application and being paired with the locking device at time of the user entering the software application; d) providing a second mode recognizing the one user operating the lock by activating the software controller via physically tapping the handle-cover, by using an RFID (radio-frequency identification) or NFC (near-field communication) technology in a form of card, tag, label, fob or in any other physical form, by connection via a mobile application; e) allowing the lock or the mobile application to make a query to a server to check user rights in response to at least the first mode and second mode selected by the user; f) opening the lock when the rights are confirmed and inserting a parcel to open locker or removing package from the locker and closing the door by the user; g) allowing a sensor on the door recognizing the closed state and activating the controller to close the lock; h) allowing the mobile application or the lock via a server to send information to the end-user that the door has been opened and the lock is closed.

DESCRIPTION OF DRAWINGS

The invention is now illustrated by means of the appended drawings.

Figure 1A:
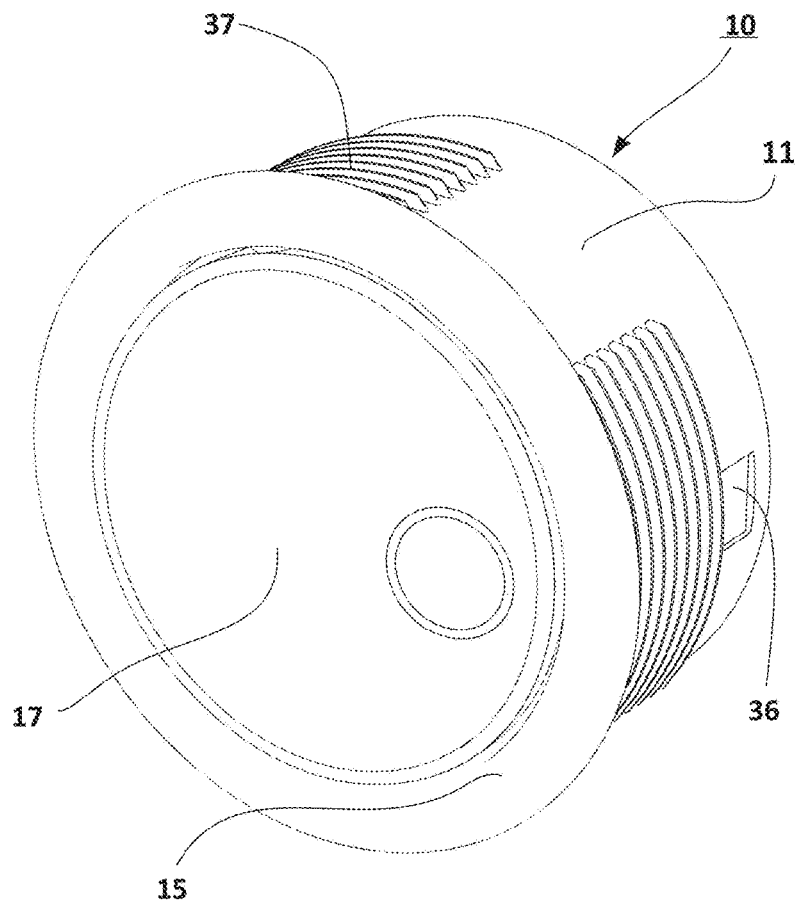
FIGS. 1A-1B show schematically a perspective view of a locking device according to an advantageous example of the invention.
Figure 1B:
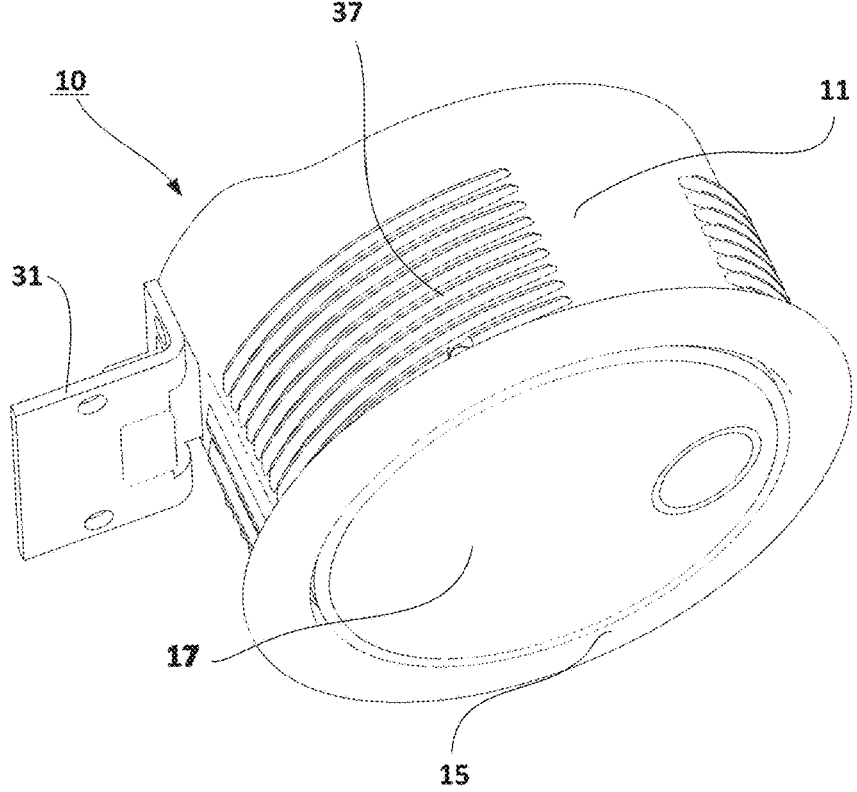
Figure 2:
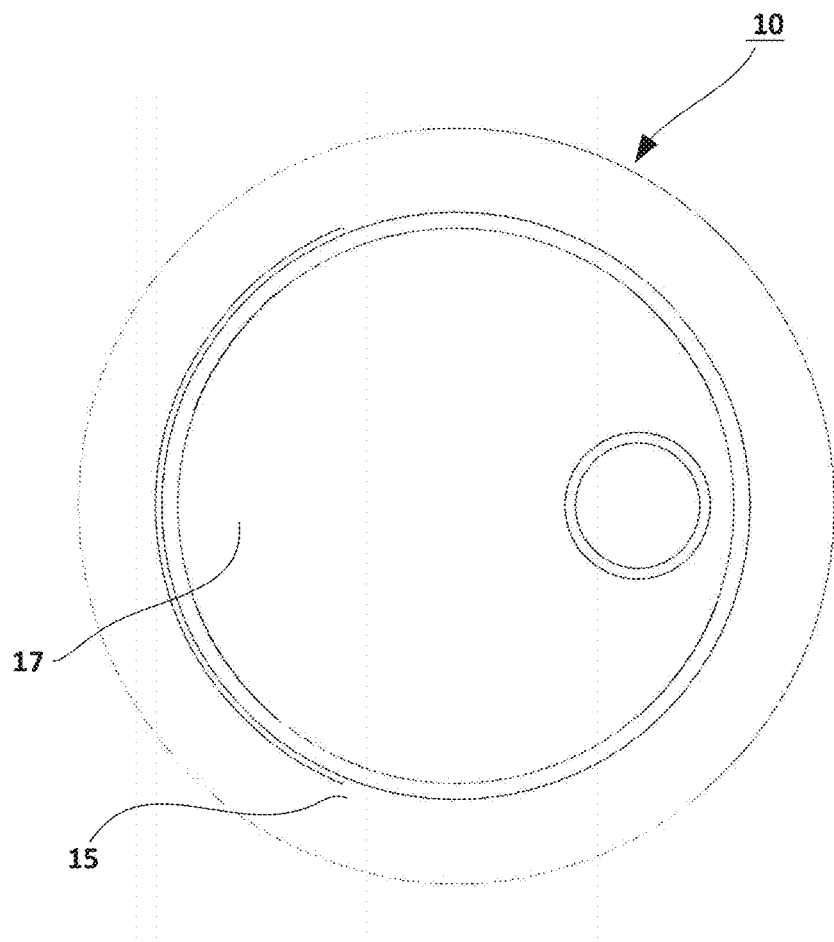
FIG. 2 shows schematically a front view of the example of the locking device in accordance with FIG. 1.

During the course of the following description like numbers and signs will be used to identify like elements according to the different views which illustrate the invention and its advantageous examples. In the figures some repetitive reference signs have been omitted for clarity reasons. Various example embodiments of the present invention relate to a locking device of a parcel box and a method for using such locking device in delivery, storing and receiving a parcel in and/or from the parcel box that allows remote opening of the parcel box in various and flexible ways of usage.

DETAILED DESCRIPTION OF THE INVENTION

Definitions

End-user—as meant in this application, is the person who can provide access to one or more users to open or close the locking device. The end-user may be for example a person who owns the parcel box e.g. a resident of an apartment complex who has rented or bought ownership to a parcel box. End-user can assign at his/her will rights for example to a service-provider or individual users to operate the lock.

User—as meant in this application, is the person who physically opens the lock for inserting or removing items from the parcel box. Typically, the user is a courier, but it may be any person that has been provided with access as described in this application to physically open the lock.

A service provider—as meant in this application, is a courier service for example. The service provider may give rights to individual couriers as users.

Administrator—as meant in this application, is the administrator of the software application enabling opening and using accounts for using the locking system.

By giving commands to the lock, the end-user, the user, the service provider or the administrator controls software controller on the lock. The controller is a software unit inside the lock, which is controlling all the functionalities of the lock, manages all communications that need to happen between each component on the PCB.

In the figures, in FIGS. 1A-8 is shown one advantageous example of the locking device and in FIGS. 9-19 is shown another advantageous example of the locking device. The locking device, also called the lock 10, comprises a lock body 11, which comprises the lock's housing with all internal components. The lock 10 also may have a front face plate 12, as shown in the example of FIGS. 9-16. The lock 10 may also comprise at least one solar panel 13, example of FIGS. 9-16, or a solar panel may be assembled separately of the lock and not one piece, example of FIGS. 1A-8. The solar panel 13 is a source of energy for the lock's electronics and charges a rechargeable battery 26 of the lock 10. The lock 10 further comprises a cellular antenna 14 for data communication with a server. The lock 10 has a lock body shell 15, which forms and is thus the lock's 10 housing and has outer thread 37 for mounting. The lock 10 has also a lock base part 16, which is the lock's 10 bottom part and has an integrated slide 33 allowing linear movement of a deadbolt 20, a rack 22, and a handle-blocker 21.

Figure 10:
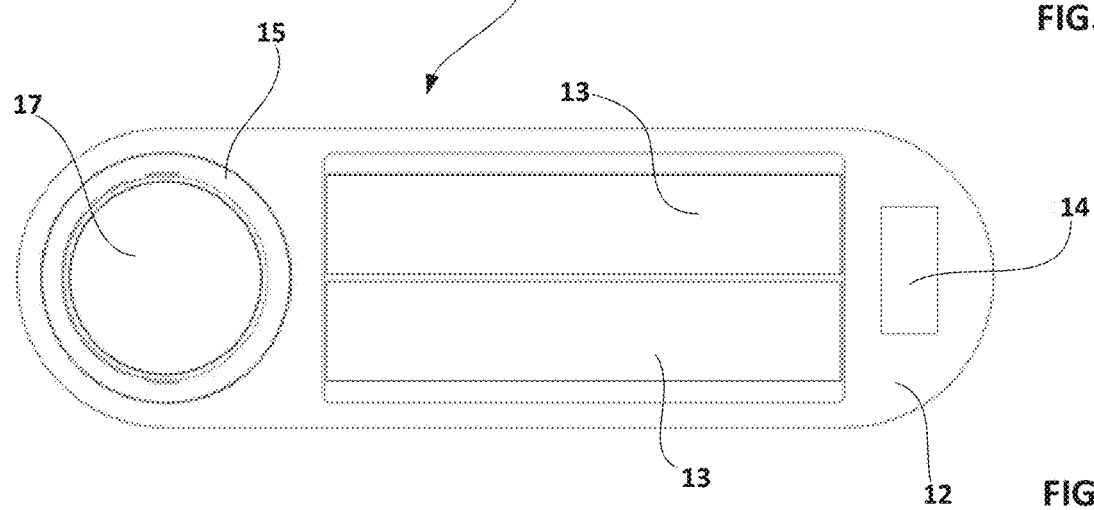
FIG. 10 shows schematically a front view of the second example of the locking device in accordance with FIG. 9.
Figure 11:
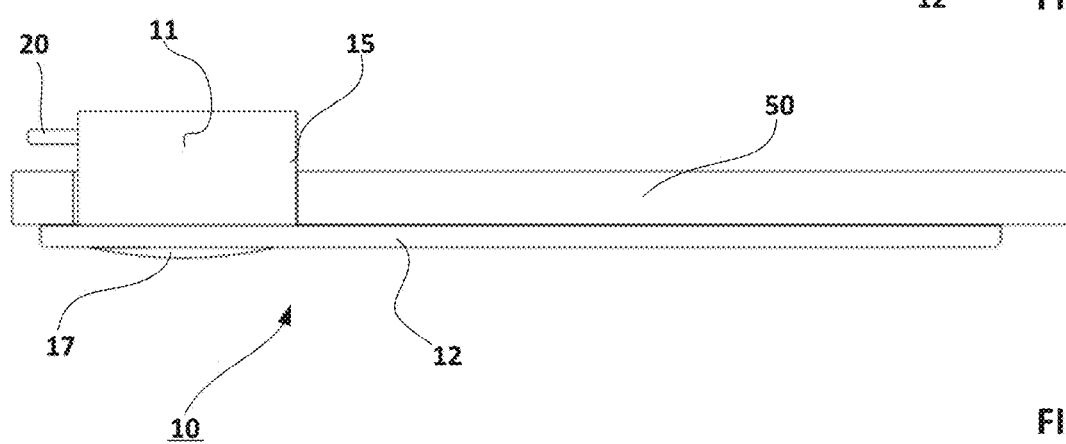
FIG. 11 shows schematically a top view of the second example of the locking device in accordance with FIGS. 9 and 10.
Figure 12:
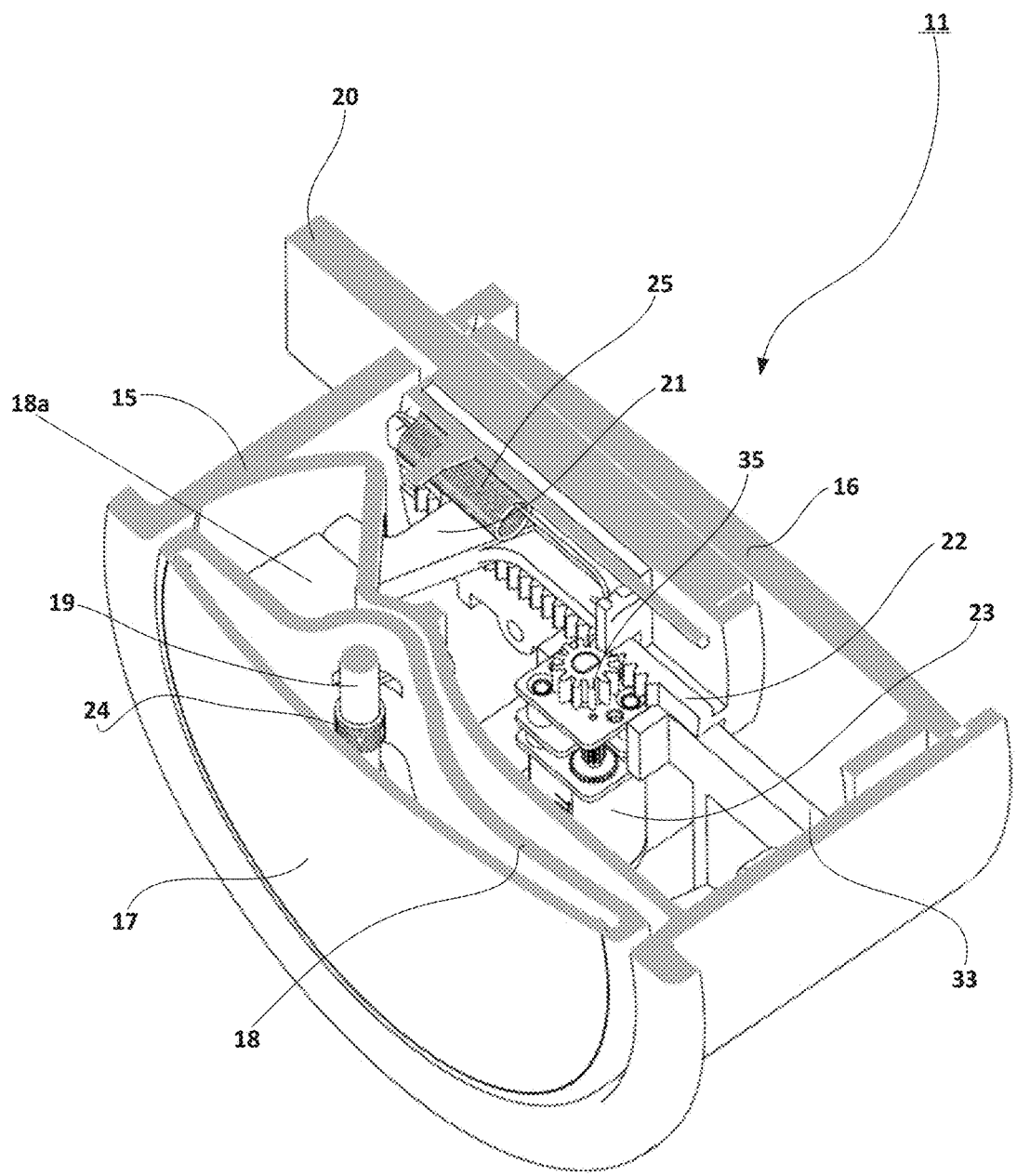
FIG. 12 shows schematically a perspective section view of a lock body of the locking device according to the second advantageous example of the invention in accordance with FIGS. 9-11, when the lock is locked.
Figure 13:
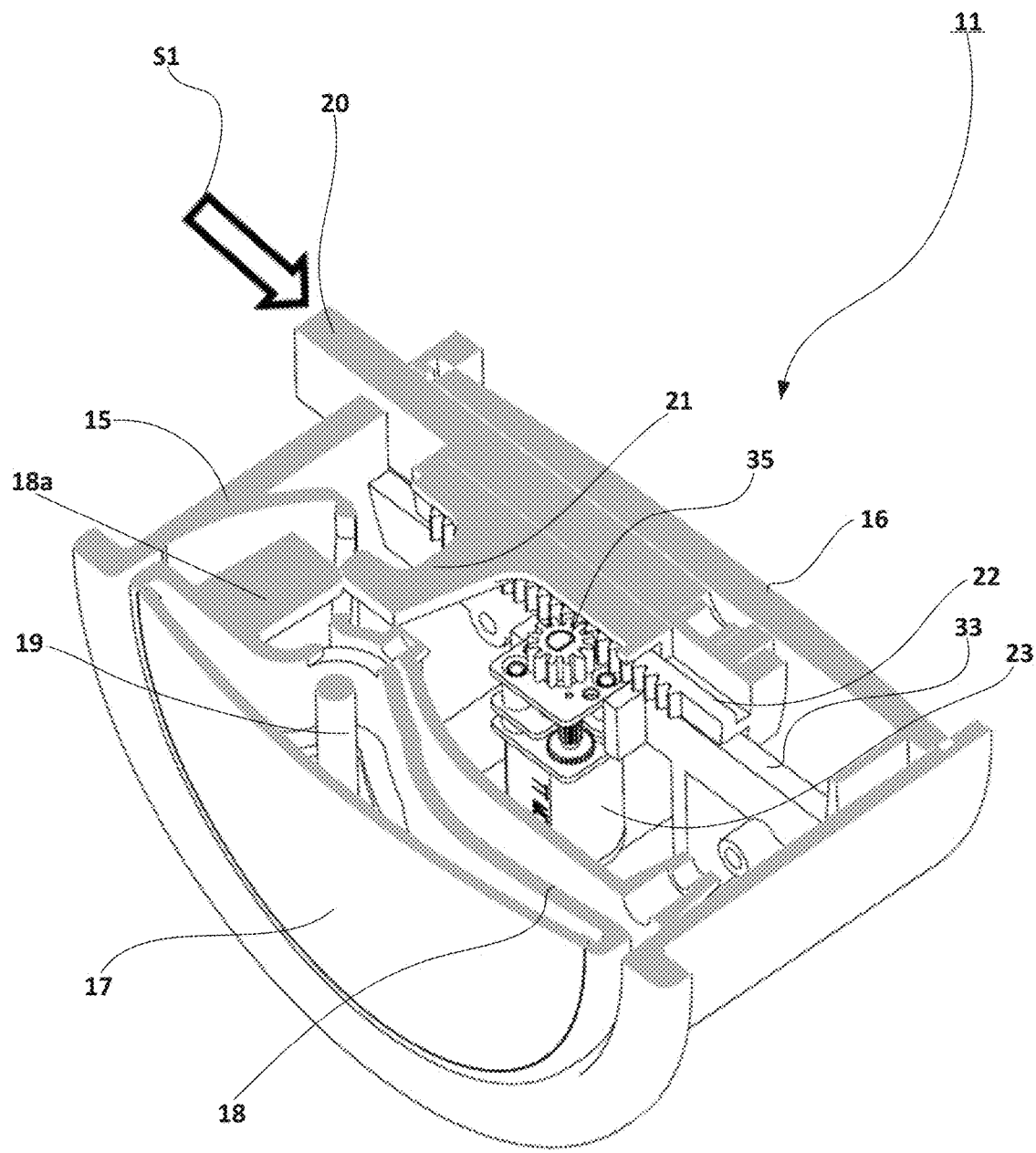
FIG. 13 shows schematically a perspective view of a lock body of the locking device according to the advantageous second example of the invention in accordance with FIGS. 9-11 with the lock in preopening stage. Arrow S1 shows the sliding direction of the deadbolt.

Further, the lock 10 may comprise a handle cover 17 for protecting the cellular antenna 14. The lock comprises a handle-body 18, which is a main part of the handle used for opening a door 50 of a compartment or a like, onto which the lock 10 is installed for locking, by a user. The handle-body may have an extension element 18a. In FIG. 10, the cellular antenna 14 locates such that it signals out of the lock. If the antenna locates deep inside the lock it may not signal outside the lock; therefore, according to one preferred embodiment the antenna locates behind the handle-cover 17 and the handle-cover 17 then protects the antenna. There is also a handle axle 19, which allows the handle to rotate into open and closed states. A deadbolt 20 functions as an object in lock sliding into a fixed groove or other obstacle to close compartment's door on which the lock 10 is attached. A handle-blocker 21 is provided in closed state to block rotation of the handle and in opened state the handle-blocker 21 has freedom to move along rack 22 and deadbolt 20 thus allowing the handle to move independently from the deadbolt 20. A rack 22 is a part mounted on the deadbolt 20, and the rack acts as linear element in a rack and a pinion mechanism. A geared motor 23 comprises a DC motor with gearbox. A handle opening torsion spring 24 opens the handle, if the handle is not blocked by the handle-blocker 21. A blocker retraction spring 25 retraces the handle-blocker 21, if external obstruction of the handle movement is removed and the spring therefore moves the handle into its original position. A rechargeable battery 26 provides load levelling for the system. There is also a PCB (printed circuit board) 27 to which a LED (light emitting diode) is connected to. The lock 10 may also comprise a snap action switch 28, which is a switch for detecting user input, and a switch plunger 29, which is a mechanical extension of the snap action switch to add weather resistance, and limit switches 30 for detecting limits of the deadbolt's actuation.

Figure 3A:
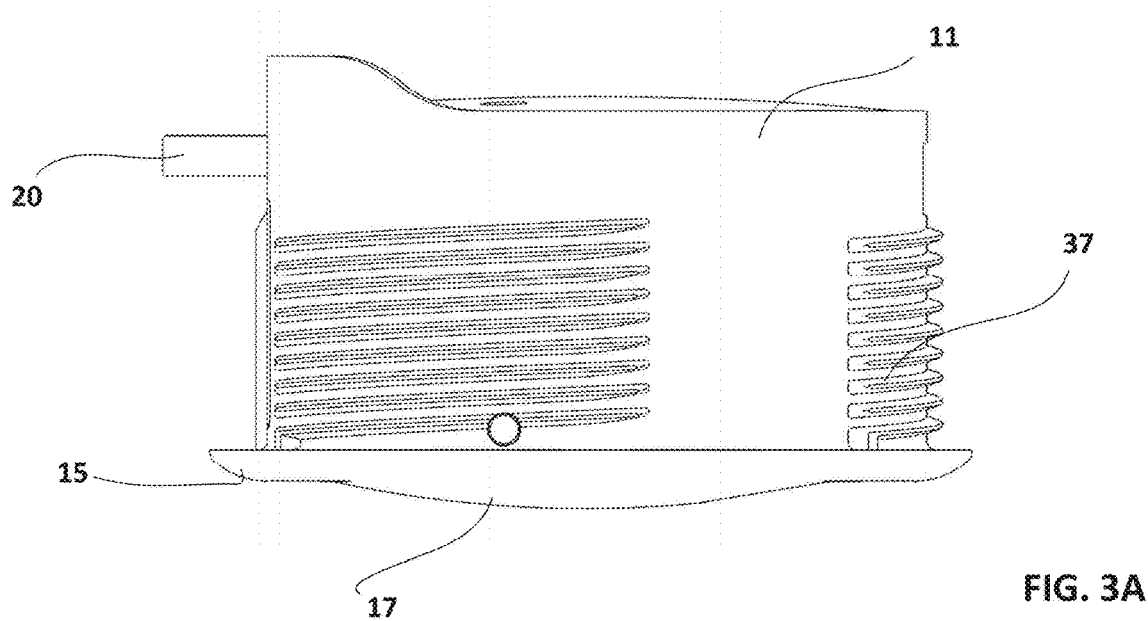
FIG. 3A-3B show schematically a top view of the example of the locking device in accordance with FIGS. 1A, 1B and 2.
Figure 3B:
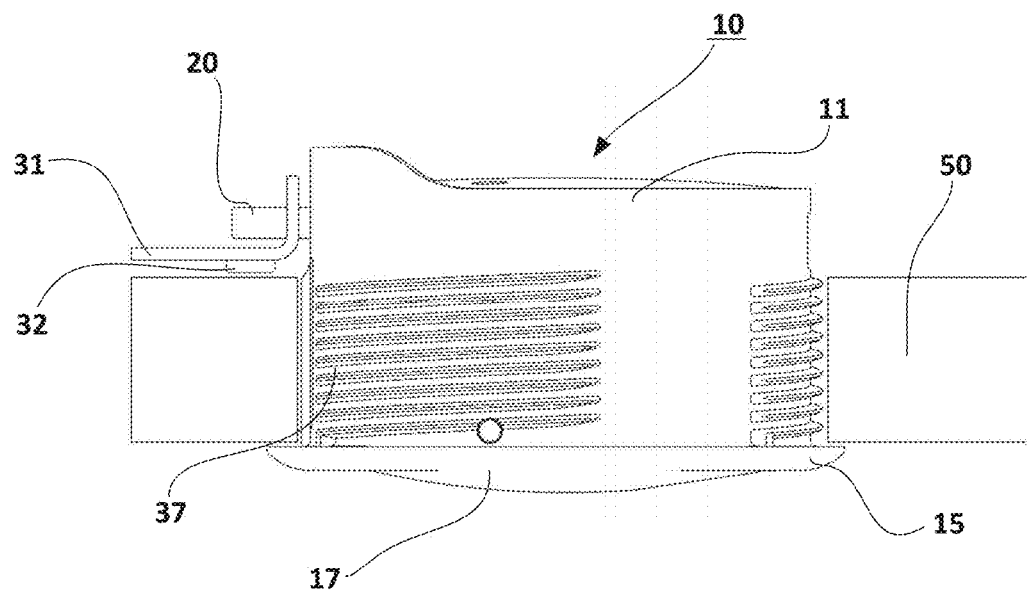
Figure 4:
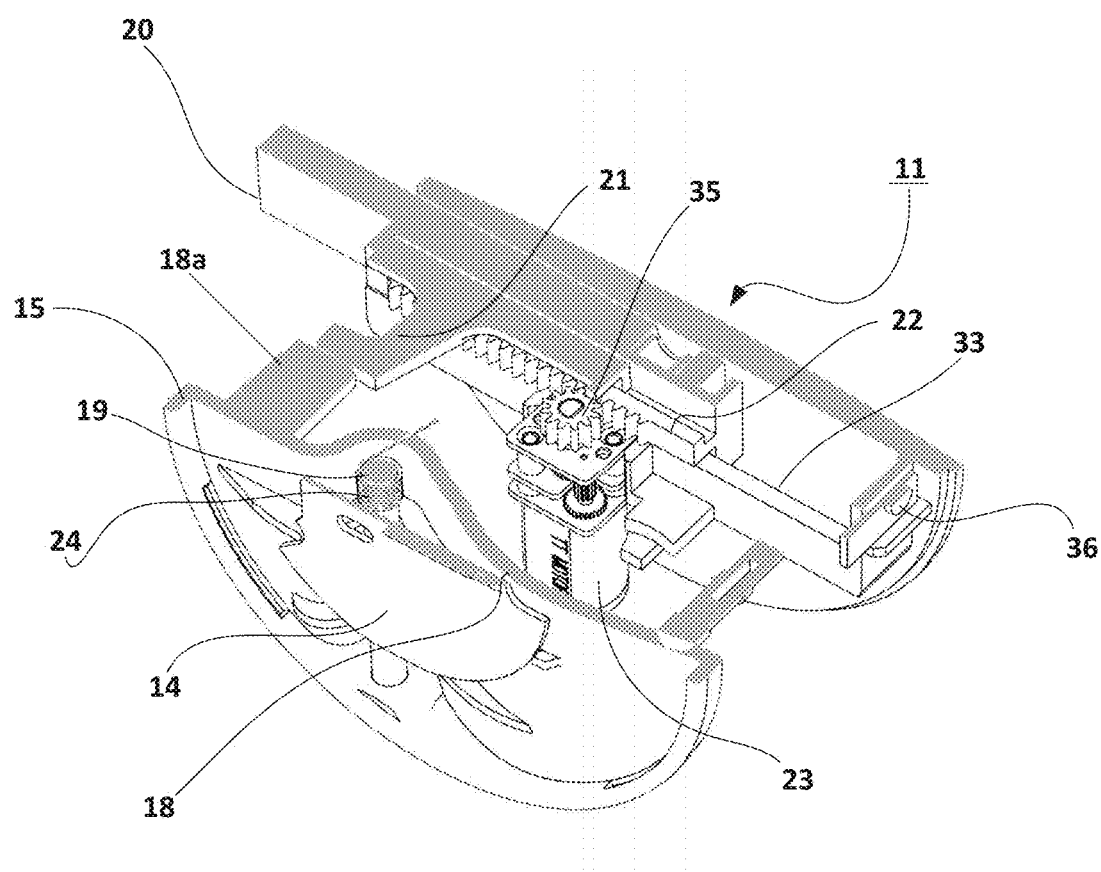
FIG. 4 shows schematically a perspective section view of a lock body of the locking device according to the advantageous example of the invention in accordance with FIGS. 1A-3, when the lock is locked.
Figure 5:
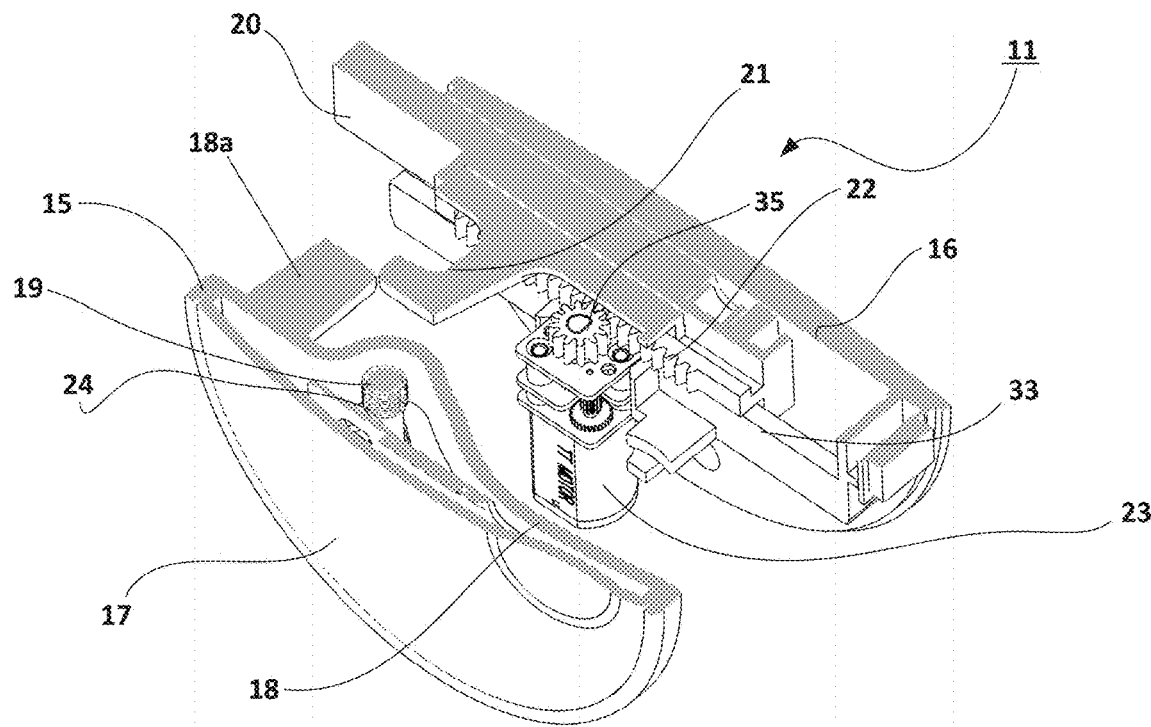
FIG. 5 shows schematically a perspective view of a lock body of the locking device according to the advantageous example of the invention in accordance with FIGS. 1A-3 with the lock in preopening stage.
Figure 6:
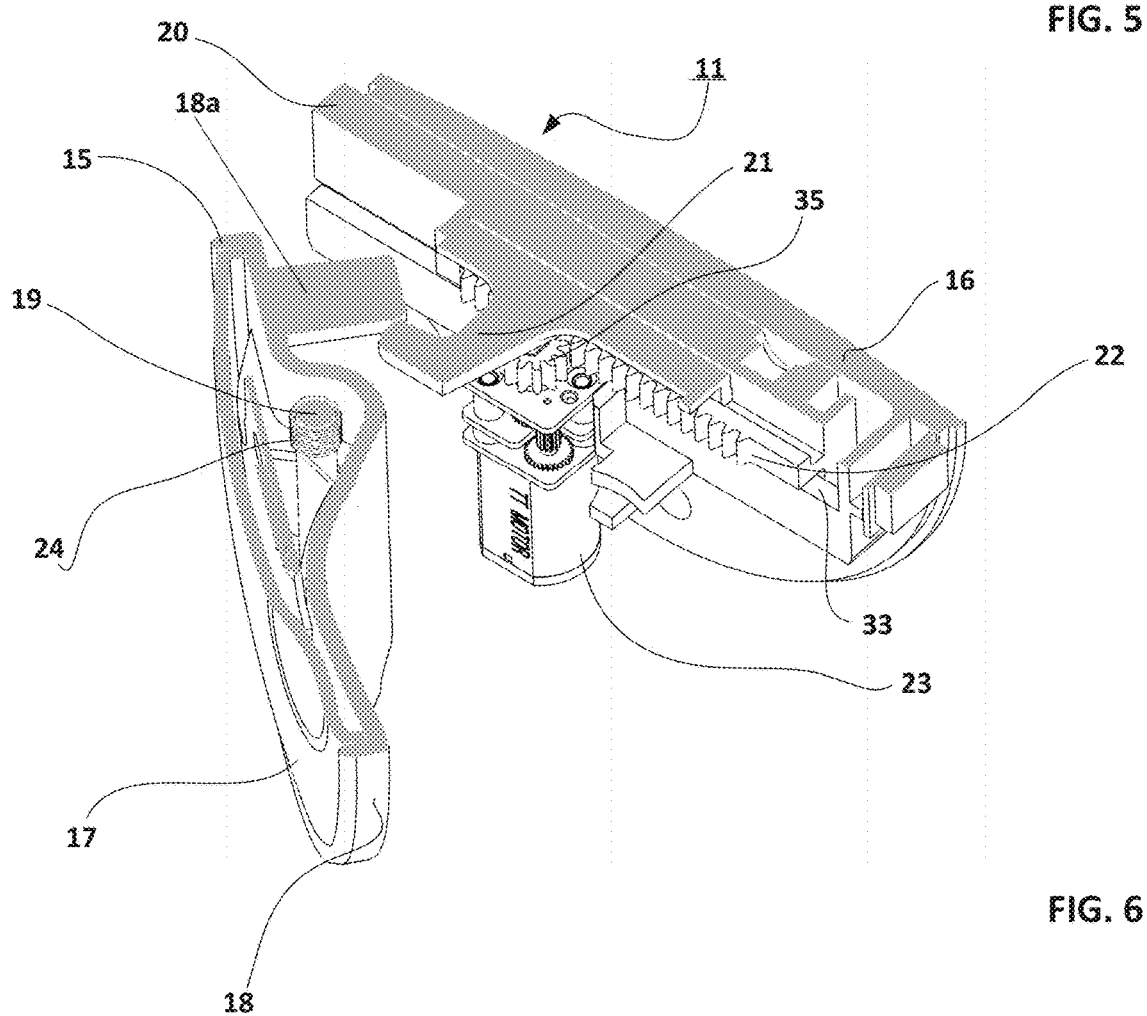
FIG. 6 shows schematically a perspective view of a lock body of the locking device according to the advantageous example of the invention in accordance with FIGS. 1A-3, when the lock is opened (unlocked).
Figure 7:
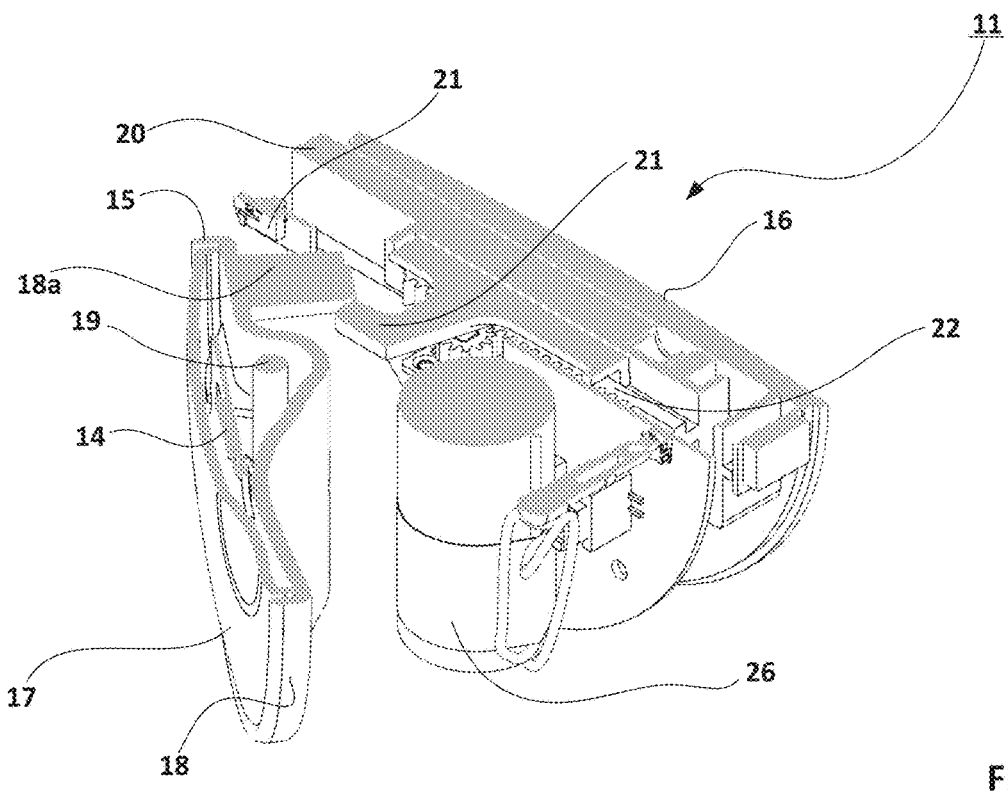
FIG. 7 shows schematically a perspective view of locking parts of the locking device according to the advantageous example of the invention in accordance with FIGS. 1A-6.

Now referring to the FIGS. 1A-8 and the example shown in them, the lock 10 can be installed in doors with variable width and thickness with self-adjusting fixing mechanism, shown in FIG. 3B. The lock comprises a lock body 11, at least one solar panel 13, a cellular antenna 14, a lock body shell 15, a lock base part 16, a handle-cover 17, a handle-body i.e. a handle 18 optionally having an extension element 18a, a handle axle 19, a deadbolt 20, a handle-blocker 21, a rack and pinion mechanisms comprising a rack 22 and a pinion 35, a geared motor 23, a handle opening torsion spring 24, a blocker retraction spring 25, a rechargeable battery 26, a PCB 27, a snap action switch 28, a switch plunger 29, and limit switches 30. Thus, the locking device i.e. the lock 10 comprises: a lock body 11, which includes lock mechanism; and a user operable handle comprising a handle-cover 17, handle-body 18 optionally with an extension element 18a, handle axle 19, dead bolt 20 and handle blocker 21, and electronics comprising rechargeable battery 26, PCB (printed circuit board) 27, snap action switch 28, switch plunger 29 and limit switches 30, and a front face plate 12 which includes at least one solar panel 13 and an antenna 14 for cellular data, Bluetooth® or other radio technology. The lock body 11 comprises advantageously also a PCB body, in which there is a LED (light emitting diode) for illuminating compartment interior and connected to the PCB 27 and a Hall sensor 34 detecting closed position of the door onto which the lock is installed. LED can be switched on or off by the software according to the state of the locking of the lock 10. The solar panel does not need to locate physically proximate to the lock but may as well locate for example on a side or top of the parcel box. FIG. 7 shows an example of location of solar panel connection 38 in the lock.

When unlocking the lock 10, the user, for example a courier taps the handle-cover 17, which activates the snap action switch 28 on the PCB 27 via the mechanical switch extension i.e. the switch plunger 29. This indication is then used for different tasks determined by software. If permission is granted for opening by a software, a lock motor 23 starts to rotate. Rotation of the motor causes the rack and pinion mechanism comprising the rack 22 and the pinion 35 to drive the rack 22, deadbolt 20 and the handle-blocker 21 into opened position. The handle-blocker 21, and the handle-body 18 are sliding against each other in a linear or otherwise parallel contact, therefore the handle remains closed. The linear or parallel contact is preferably between the extension element 18a of the handle-body and the handle-blocker 21. However, it is to be understood that the linear or parallel contact may be created by different shapes of the handle, as well-the purpose being the handle-blocker to block the movement of the handle. In the examples here, the contact is a linear one, but it can as well be for example a curved contact. The term linear or parallel contact is meant to mean any kind of contact between the handle-body or the handle body extension and the handle blocker that would prevent the movement of the handle. The linear or parallel contact of the handle-blocker 21 and the extension element 18a of the handle-body 18 becomes obsolete, i.e. does no more exist, as shown in FIG. 5, when the set of deadbolt 20, and the handle-blocker 21, and rack 22 continues to move in opening position direction. The handle 18 starts to rotate into open position as shown in FIG. 6 by the force of the torsion spring 24. The set of deadbolt 20 and handle-blocker 21, and rack 22 stops at fully open position. The lock 10 is now in unlocked position, handle 17 is opened for pulling the door 50 open.

Figure 8:
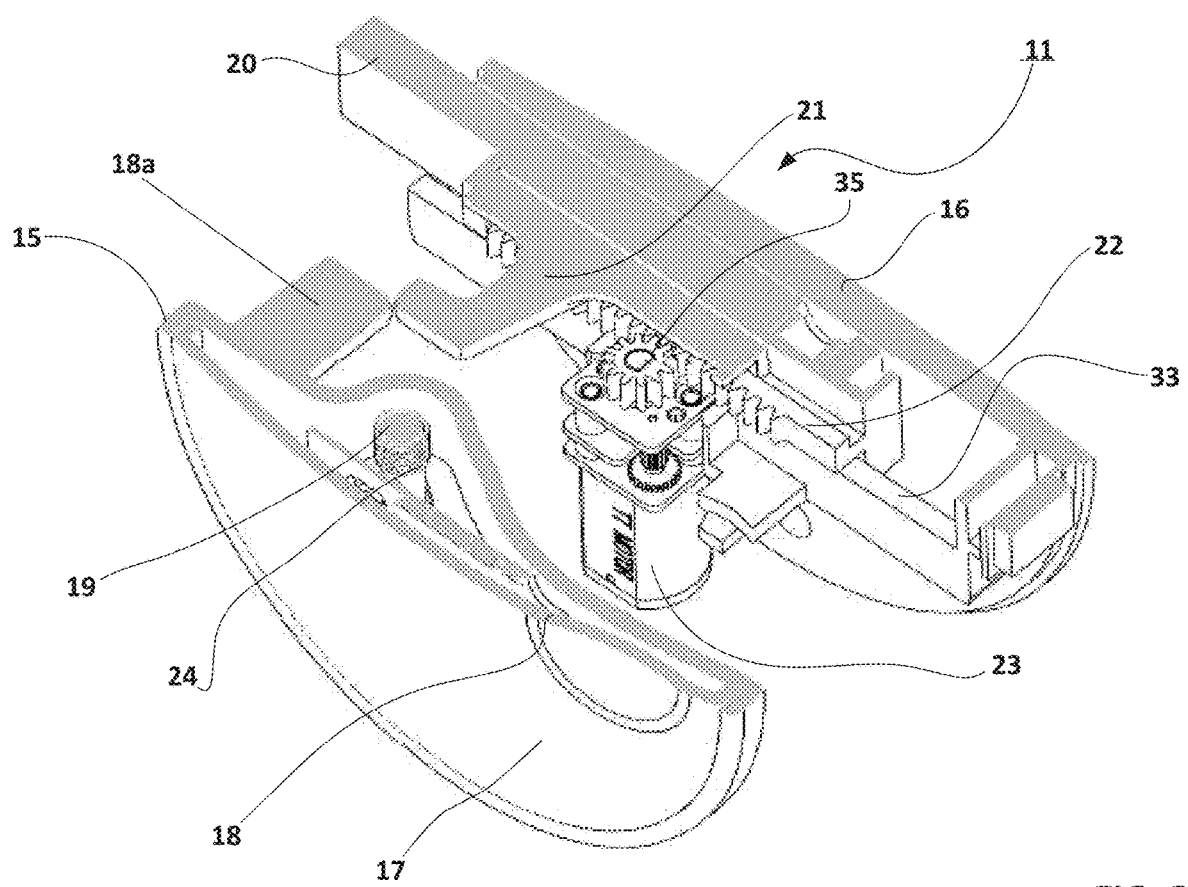
FIG. 8 shows schematically a perspective view of a lock body of the locking device according to the advantageous example of the invention in accordance with FIGS. 1A-3 with the lock in preclosing stage.
Figure 9:
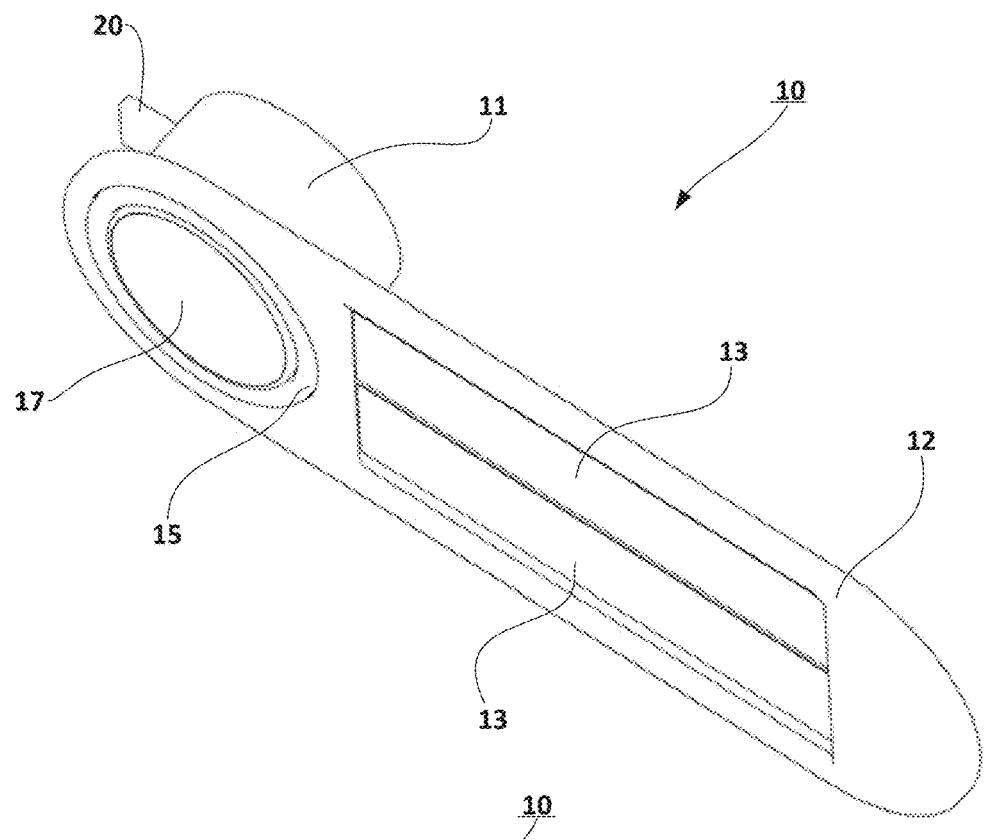
FIG. 9 shows schematically a perspective view of a locking device according to a second advantageous example of the invention.

When locking the lock 10 the door 50 is closed by a user. Closed state of the door 50 is detected by magnetic or other type of sensor 34 installed in the lock body 11. A magnet 32 with a strike plate 31 or similar solution keeps holding the door 50 in a fully closed position. Hall sensor 34 is used to detect magnetic field in the closed position of the door. The set of deadbolt 20 and handle-blocker 21, and rack 22 starts to move into a locked position. The handle-blocker 21 starts to rotate the handle 18 into closed position as the linear or parallel contact of the blocker and the extension element is re-established, as shown in FIG. 8. While the rack 22 and the deadbolt 20 are fixed to each other, the handle-blocker 21 has freedom to slide in the direction of the movement of the set of deadbolt 20 and handle-blocker 21, and rack 22, thus allowing continuing movement of the deadbolt 20 into the locked position (i.e. the deadbolt slides into a fixed groove or other obstacle in the door) while movement of the handle 18 is blocked by user or other circumstance. If movement of the handle 18 is released, the handle 18 closes by the force of the retraction spring 25 of the handle-blocker 21. The set of deadbolt 20 and latch blocker 21, and rack 22 stops at fully closed position. The lock 10 is now in locked position, handle 18 is closed and cannot be opened manually.

Now referring to the FIGS. 9-16 and the example shown in them, the lock 10 can be installed in doors with variable width and thickness with self-adjusting fixing mechanism, shown in FIG. 3. The lock comprises a lock body 11, at least one solar panel 13, a cellular antenna 14, a lock body shell 15, a lock base part 16, a handle-cover 17, a handle-body i.e. a handle 18 with an extension element 18a, a handle axle 19, a deadbolt 20, a handle-blocker 21, a rack 22, a geared motor 23, a handle opening torsion spring 24, a blocker retraction spring 25, a rechargeable battery 26, a PCB 27, a snap action switch 28, a switch plunger 29 and limit switches 30. Thus, the locking device i.e. the lock 10 comprises: a lock body 11, which includes lock mechanism; and a user operable handle comprising a handle-cover 17, handle-body 18, handle axle 19, dead bolt 20 and handle-blocker 21, and electronics comprising rechargeable battery 26, PCB (printed circuit board) 27, snap action switch 28, switch plunger 29 and limit switches 30, and includes at least one solar panel 13 and an antenna 14 for cellular data, Bluetooth® or other radio technology. The lock body 11 comprises advantageously also an integrated LED (light emitting diode) 36 for illuminating interior of the mailbox. The LED can be switched on or off by the software according to the state of the locking of the lock 10.

Figure 14:
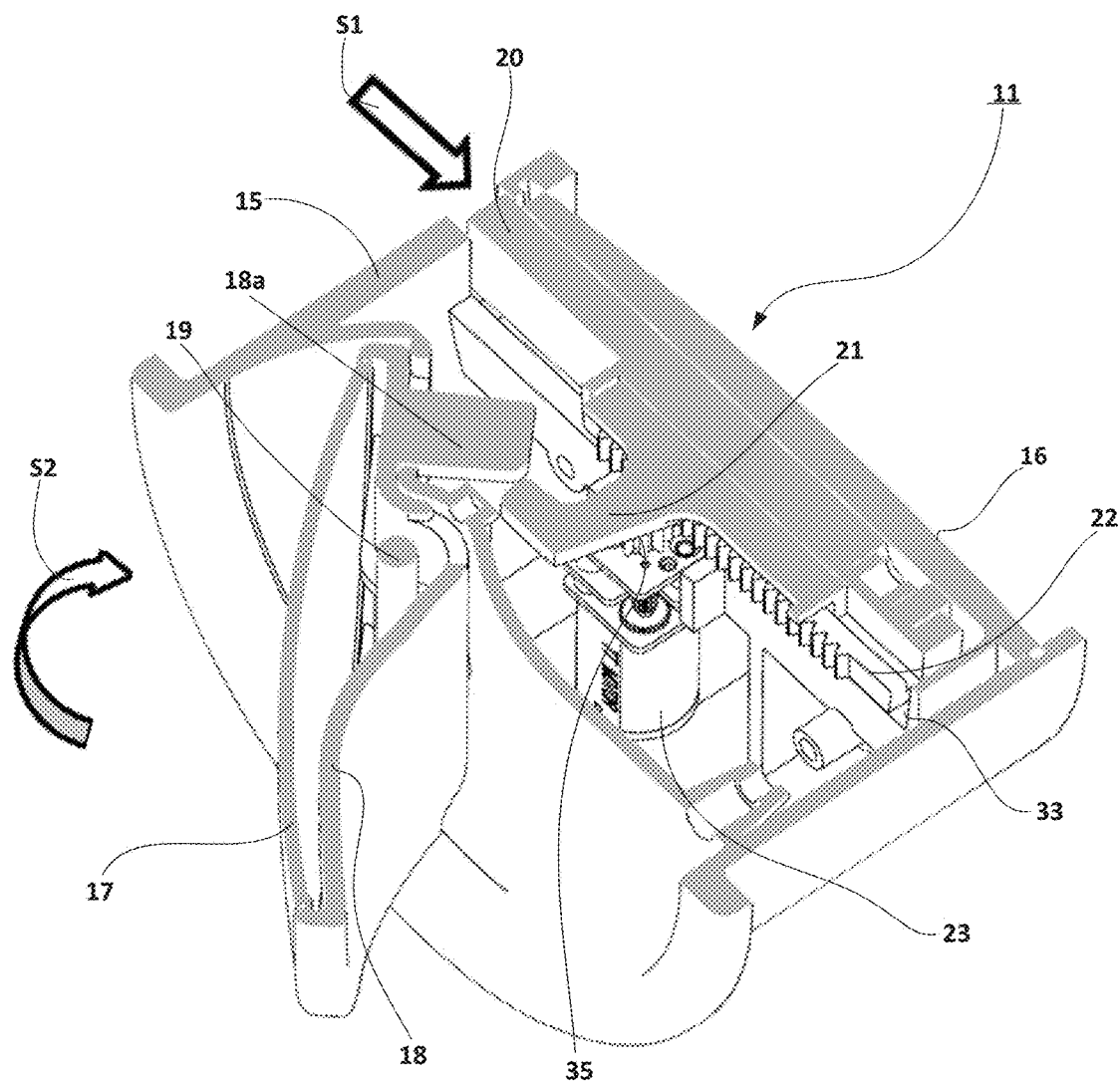
FIG. 14 shows schematically a perspective view of a lock body of the locking device according to the second advantageous example of the invention in accordance with FIGS. 9-11, when the lock is opened. Arrow S1 shows the direction the deadbolt has been moved as compared to preopening stage shown in FIG. 13. Arrow S2 shows direction of the handle to open.
Figure 15:
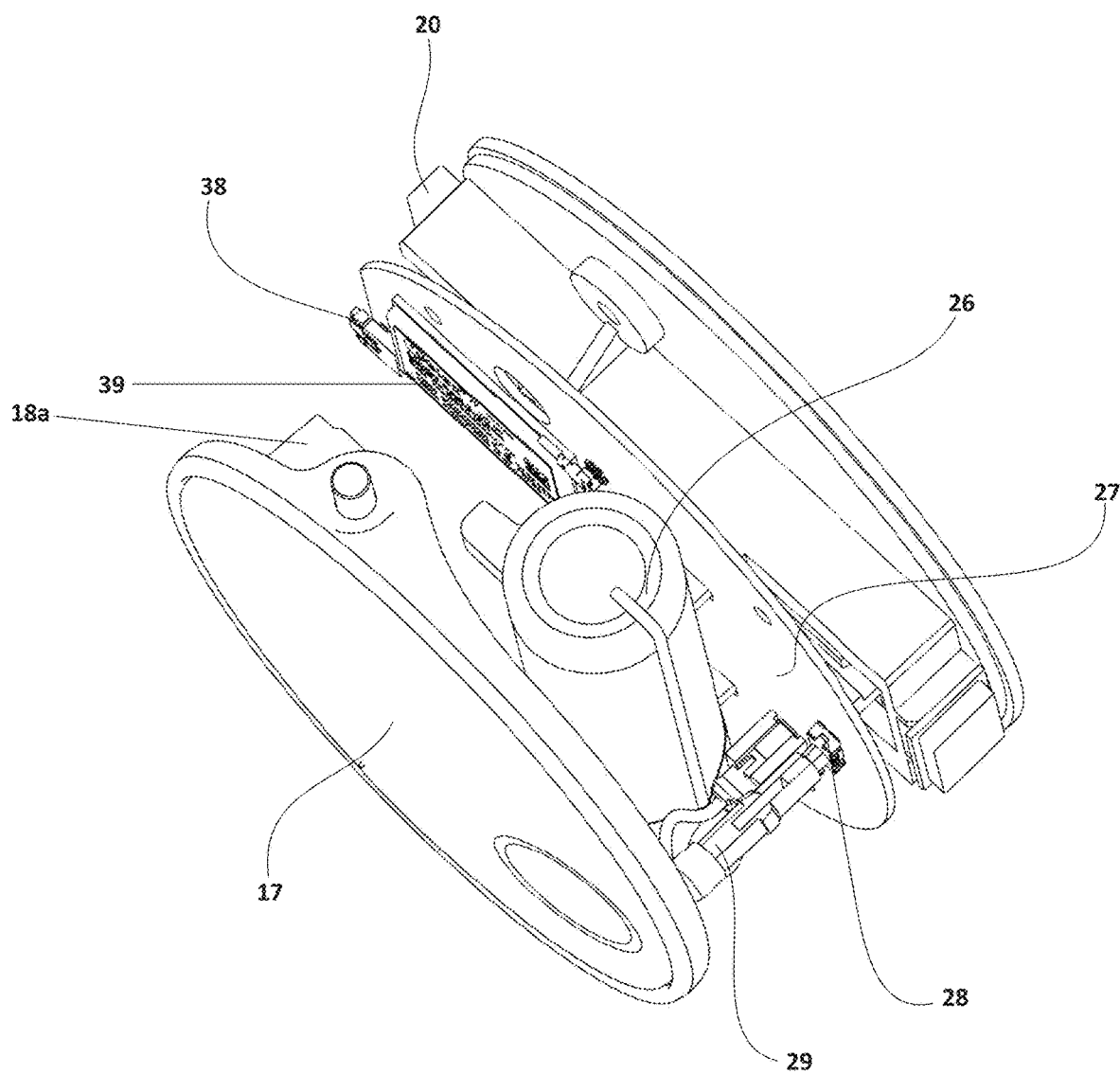
FIG. 15 shows schematically a perspective view of locking parts of the locking device according to the second advantageous example of the invention in accordance with FIGS. 9-14.
Figure 16:
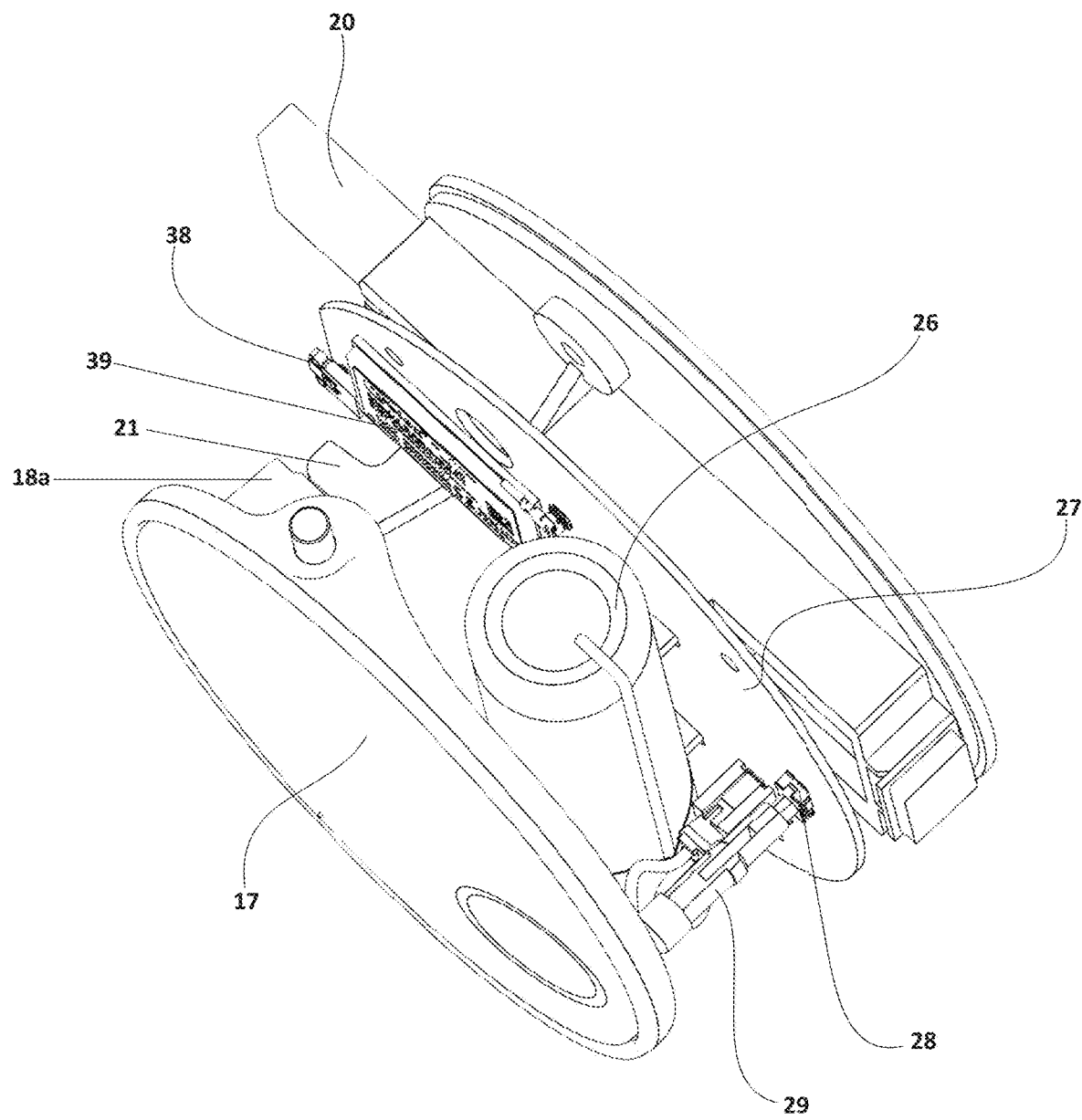
FIG. 16 is another schematic perspective view of locking parts of the locking device according to an alternative example.
Figure 17:
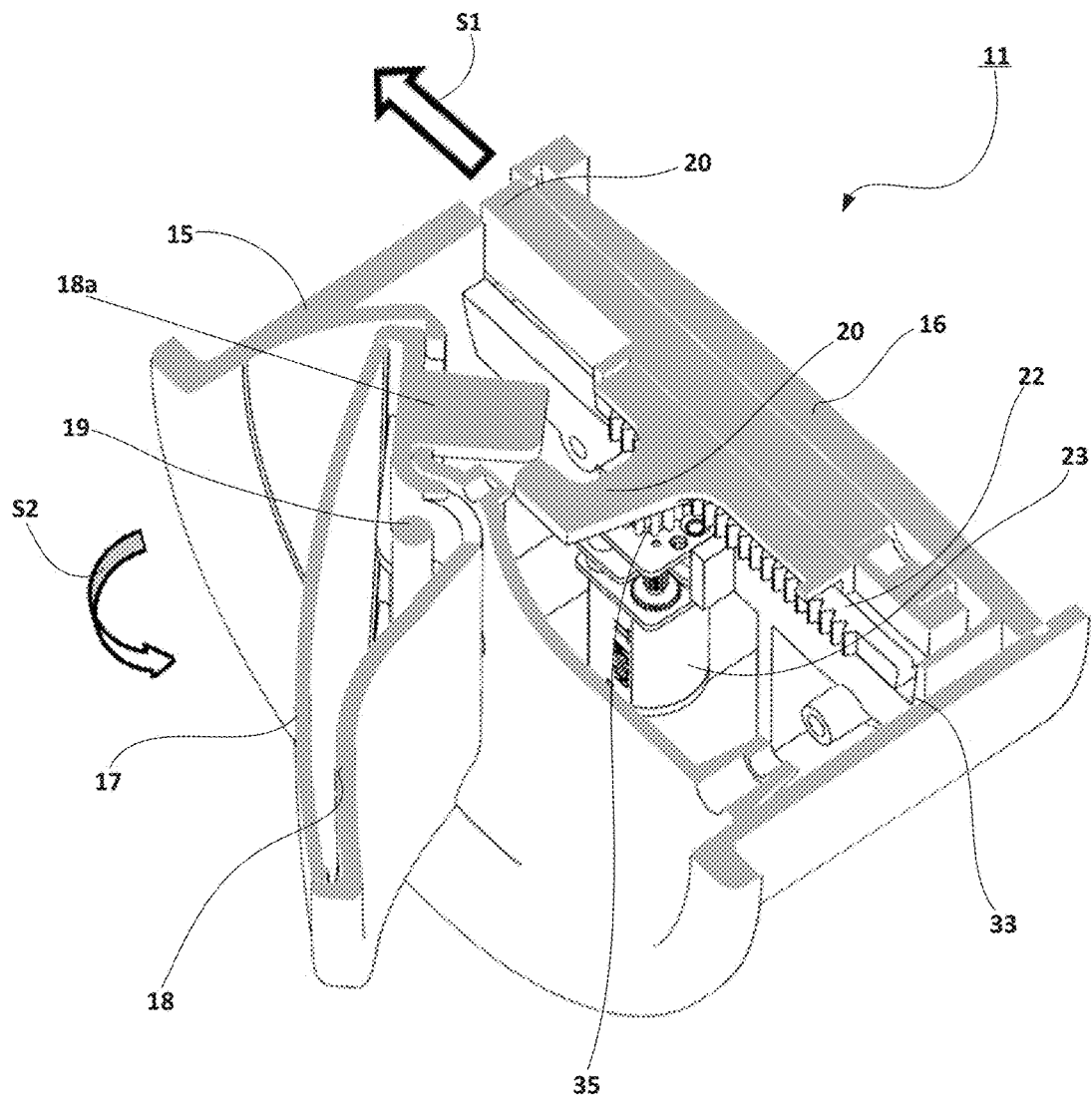
FIG. 17 shows schematically a perspective view of a lock body of the locking device according to the second advantageous example of the invention in accordance with FIGS. 9-15 with the lock in preclosing stage. Arrow S1 shows the sliding direction of the deadbolt and arrow S2 shows the closing direction of the handle.
Figure 18:
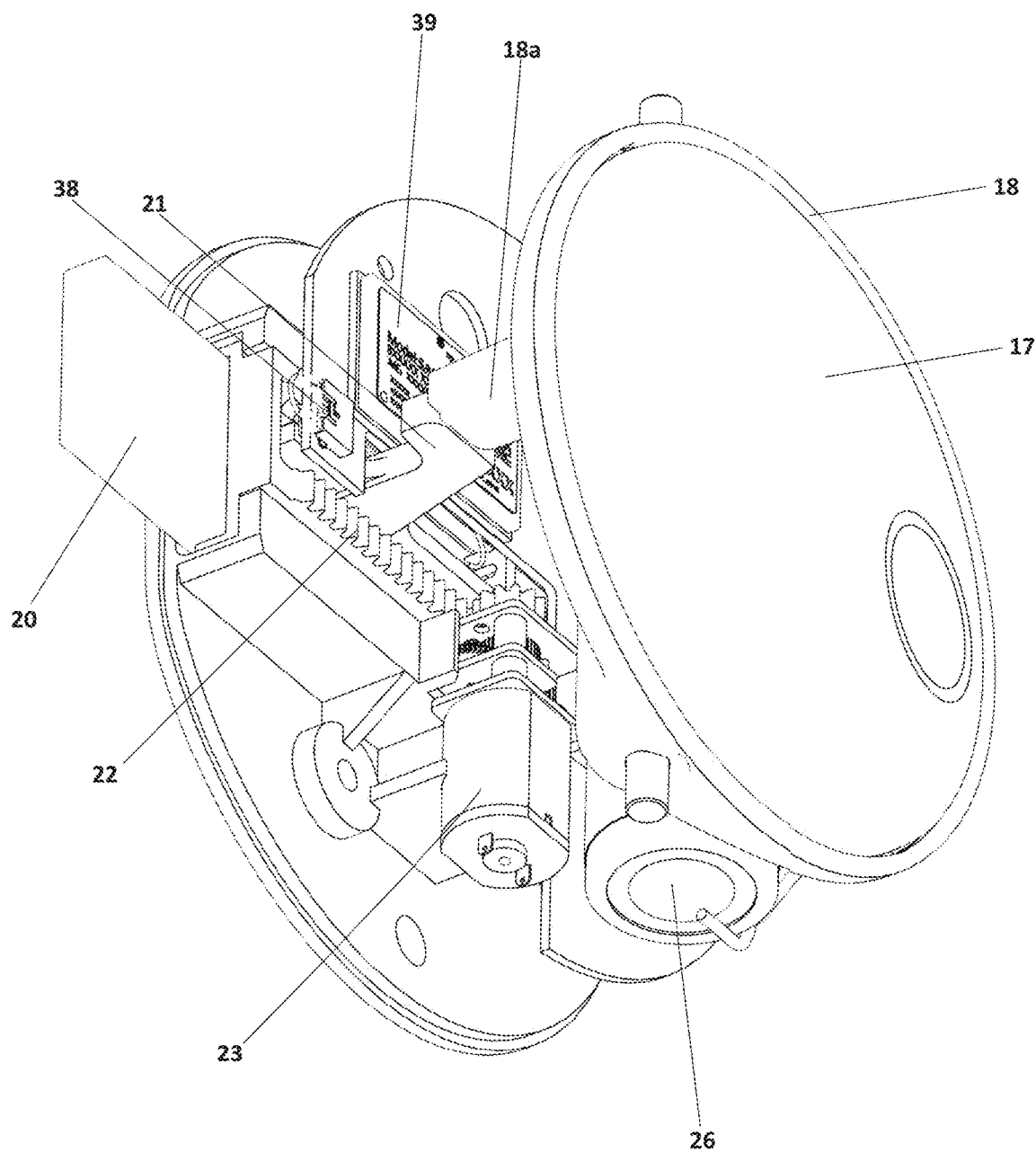
FIG. 18 shows another perspective view of the locking device showing the locking parts.
Figure 19:
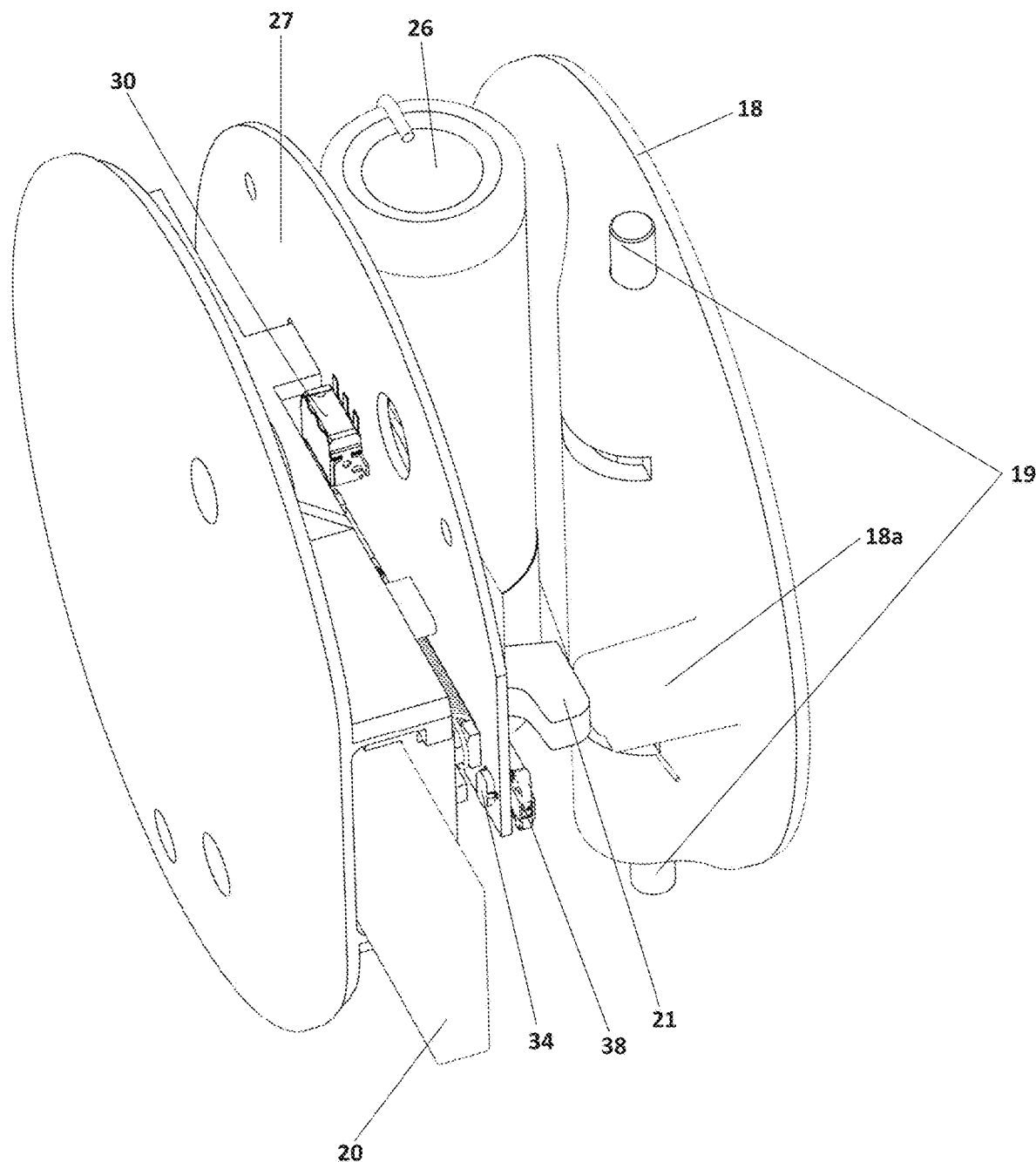
FIG. 19 shows another perspective view of the locking device showing the locking parts.

When unlocking the lock 10, the user, for example the courier, taps the handle 18, which activates the switch 28 on PCB 27 and a mechanical switch extension i.e. the switch plunger 29. This indication is then used for different tasks determined by software. If permission is granted for opening by software, a lock motor 23 starts to rotate. Rack 22 and pinion mechanism starts to drive the rack 22, deadbolt 20 and handle-blocker 21 into opened position. The handle-blocker 21 and the handle-body 18 (preferably via the extension element) are sliding in a linear or parallel contact, therefore handle remains closed. The contact of the handle blocker 21 and the extension element of the handle-body 18 is becoming obsolete i.e. does no more exist when the set of deadbolt 20 and handle-blocker 21, and rack 22 continues to move in opening position direction. The handle 18 starts to rotate into open position as shown in FIG. 14 by the force of the torsion spring 24. The set of deadbolt 20 and handle-blocker 21, and rack 22 stops at fully open position. The lock 10 is now in unlocked position, the handle 18 is opened and can be used for pulling the door 50 open.

When locking the lock 10 the door 50 is closed by user. Closed state of the door 50 is detected by magnetic or other type of sensor 34 installed in the lock body 11. A magnet 32 with a strike plate 31 or similar solution keeps holding the door 50 in a fully closed position. The set of deadbolt 20 and handle-blocker 21, and rack 22 starts to move into a locked position (deadbolt slides toward a fixed groove or other obstacle in the door). The handle-blocker 21 starts to rotate handle 18 into closed position, as shown in FIG. 8. While rack 22 and the deadbolt 20 are fixed to each other, the handle-blocker 21 has freedom to slide in the direction of the movement of the set of deadbolt 20 and handle-blocker 21, and rack 22 thus allowing continuing movement of the deadbolt 20 into the locked position while movement of the handle 18 is blocked by user or other circumstance. If movement of the handle 18 is released, the handle 18 closes by the force of the retraction spring 25 of the handle-blocker 21. The set of deadbolt 20 and handle-blocker 21, and rack 22 stops at fully closed position. The lock 10 is now in locked position, handle 18 is closed and cannot be opened manually. When the handle is closed one cannot grip it, while when it is open the handle can be gripped to open the door. The lock is preferably so designed that when the lock is closed and accordingly the handle is closed, the surface of the lock is flat on the door.

Figure 20:
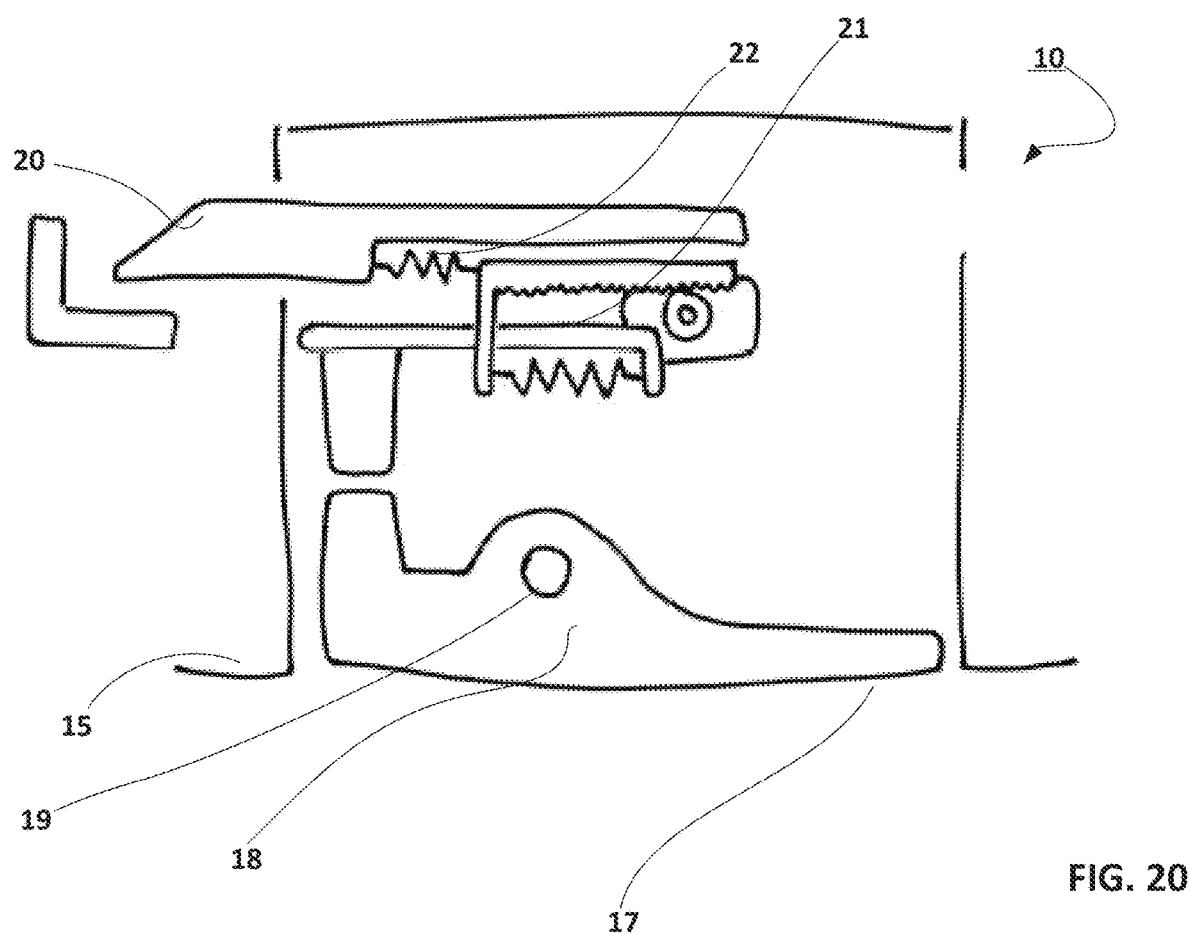
FIG. 20 shows schematically a perspective view of a deadbolt of a locking device according to a third advantageous example of the invention.

In FIG. 20 is shown a deadbolt 20 of a locking device according to a third advantageous example.

In the following advantageous functions and function flows of the locking device 10 are described in view of advantageous examples and features.

In use of the locking device as parties of usage are an End-user, a Courier (user) and a System administrator. Preferably, the lock is online and always connected to internet; although in an energy saving mode the lock is accessible over a Bluetooth® or other short-wave radio connection, while online access may not be available. When online, the lock can send any data to a server at any time. The lock can be fed by data from external devices (e.g. one or more sensors located in the parcel box, such as temperature sensors, climate control in thermo box, etc.) and the lock may send such data to a server. The lock can be opened with a mobile application. User has to have rights given by owner of the lock (end user). The lock can be opened in offline over a wireless connection, advantageously over a Bluetooth® connection, —this is typically possible only with the mobile application when the user having permission is in Bluetooth®-range, for example 20-25 meters. The lock can also be opened remotely and thus the user does not have to be in range. The lock can be opened from a distance with an ISM band e.g., with a keyfob. The lock can be opened from a distance with keyfob using Bluetooth® (user needs to be in range, 20-25 m). The lock can be opened with RFID keyfob by bringing the fob close to the lock, typically at a specified area marked on the lock. The lock can be opened with NFC on smart phone when bringing the phone close to the lock, typically a specified area marked on the lock. The lock can notify an end-user if door is opened. The lock can notify the end-user if door is not closed in specified time range. The lock can notify if battery level is low. The lock can notify if a user with no access tries to open door. The lock can notify the end user if a courier delivers package. If some actions are initiated on server side, then the lock can react right away and will perform needed action (e.g. a courier without access rights calls to the end-user to gain access to the lock, and the end-user opens the door remotely to the courier). If some data is needed to be sent out from the lock to the server, it is possible right away as connection is already established.

An End-User is in Bluetooth Range

An end-user can manage the lock from mobile application if the user is near the lock (20-25 meters). The end-user opens mobile application, gives opening command over Bluetooth® (or similar wireless application) to the lock. If command sent over Bluetooth® is correct and the user has assigned rights, then the lock will open. If not, then the lock will stay closed and mobile application gives feedback to the end user about why the lock did not open.

An End-User not in Bluetooth® Range

The lock can be opened from any location, as long as the user has an internet connection and a mobile application. If the end-user wants to open the lock from distance, e.g. courier has no application to open the lock for inserting parcel, then the end-user can open the mobile application and give order through the application to open the lock remotely. The lock is opened because the end-user has rights and the courier can now insert the parcel and close the door.

In use of the locking device the parties of usage are a system administrator, a system administrator's mobile application, an end-user, an end-user's mobile application, a courier (a user), a courier's mobile application. Preferably, for managing the lock, the end-user has following options: adding the lock account into system, pairing the lock with user ID, creating a connection with mobile application (e.g. over Bluetooth®), opening the lock with mobile application, closing the lock, giving rights to other users in mobile application, giving rights for service providers in mobile application, pairing fobs and sharing rights, opening the lock with a keyfob, creating connection with a Bluetooth® keyfob, creating connection with NFC (mobile phone or tag), creating connection with 434 MHz fob (radio), creating connection with RFID fob, creating connection remotely from mobile application or from self-service, for a courier inserting parcel.

In cases where a new lock account is added to the system, where each lock is having an account in system the account defines users and other metadata about the lock itself. The system administrator (SA) can create an account for each lock as the system administrator is a person with all rights to system managing the locks and the lock accounts. As an example, system administrator could be a manager of a housing complex that has bought or rented a parcel box for use of the residents in the housing complex. After the lock account is created, it can be available for SA to pair specific lock ID with it by a separate application for the system administrator, in which SA can open SA's application in administrator section, SA can take the lock, insert batteries in and set the lock online, SA can see the lock online in the mobile application, SA assigns this lock ID to the lock account, the lock ID and the lock account are matched together and data is sent to the server and now system knows that this lock account uses this lock ID. Alternatively the end-user (e.g. the resident having rented or bought rights to a parcel box of the housing complex) can pair the lock in the end-user application, which allows any dedicated user (e.g. courier) to become a user and in which the user can install mobile application and has two options for getting into mobile application: a) signing in with an existing account, when the end-user fills credentials and submits filled data and the server can validate credentials, b) giving a sign in a token and the application can sign in the user. If server validation fails, the user and end-user can be notified. When registering new account, the end-user needs to fill data about itself and submit filled data to be sent to the server. Then the server can create a new user with this data and send token to the mobile application. After that the user is signed in. After user is signed in, user takes a new lock and puts it into pairing mode. In that state the mobile application is able to create connection over Bluetooth® with the lock and share secret data. Pairing process can end with the lock opening itself. This meaning that the lock is ready and paired with this user. On server side a new location is created, this lock is paired with this location and this current user gets any relevant rights needed for this location. In case of creating connection with mobile application, as the user is signed in and the server requests are made, then the mobile application has all the needed information to create Bluetooth® connection with the lock and the lock is automatically connected with the mobile application over Bluetooth® if user is near the lock and the application is opened (typically, in range of 15-25 meters). One lock can have only one opened connection at a time. This means only one mobile device or keyfob can communicate with the lock at same time. If the lock has some issues with Bluetooth®, then connection is not created, and application can display proper information for user on screen. The lock is now ready for user to give command to open the lock and Bluetooth® is used to open the lock in faster way if user is near the lock, because sending queries over internet takes more time.

When opening the lock with the mobile application, the lock can be opened by pressing an opening button on mobile application and the mobile application sends opening command to the lock over created Bluetooth® connection. The user can press the lock opening button and the lock opens. The user sees that the door status in the application changes and the door handle physically can move to opened state, the lock can send data about opening (e.g. information about who was the user and what time the lock was opened) to the server over internet connection. When closing the lock, the user can close the lock physically by moving door onto which the lock is installed, into closed state. The lock can get information from sensors that the door is closed, and the lock can close itself. The user can see a visual image in the mobile application that the lock is now in closed state.

In giving rights to other users in the mobile application, while being in the mobile application, the end-user can open user management section and see list of already added users. The end-user is able to change rights for each individual user and add new one if needed. For adding new one, the end-user can fill user ID and mark preferred rights. The new user can now open application, sign in and use the lock.

In giving rights for service providers in mobile application, while being in the mobile application, the end-user can open user management section. The user sees list of already added service providers and all other ones that are possible to serve this area where the lock is located. The end user is able to remove and add new service provides if needed. For adding new one, the end user can select desired service provider and mark it. A server request is made, and the new service provider can be added to this lock and now this service provider can see this lock as available for delivery location and is able to open it.

In pairing fobs and sharing rights as an alternative for the mobile application, the user is able to open the lock with a paired keyfob. One or more keyfobs can be provided together with the lock, and the end-user may provide the fobs to users of his/her choice. The user can take a keyfob and put it into a pairing mode. In the pairing mode, the keyfob is able to switch data with the mobile application. In the mobile application, the user can select the lock with which the user wants to pair the keyfob. A mobile device can send data about the lock to the keyfob over Bluetooth® connection. The keyfob is paired, when the pairing mode stops. In sharing rights with the keyfob means, the user can pair a keyfob and give it to other user who does not need to have the mobile application for opening the lock.

As an alternative, opening the lock with keyfob (RFID), the user is able to open the lock with RFID and the user can take the keyfob and put it near to handle of the lock. The lock recognizes the keyfob, checks ID once, that is correct, and the lock can be opened. The lock can save opening information to its own memory and send it right away to server.

When creating connection remotely from the mobile application, the end-user does not need to be near the lock for opening it for someone else (courier for example). As the end-user can open the mobile application and as the lock has internet connectivity itself, the end-user can open the lock from a distance. The mobile application sends query to the server, that this lock ID needs to be opened and the server can contact the lock over the air and give command to open the door. The lock wakes up, checks data sent from the server and opens the lock if everything is correct and the door can be opened, if command is successful. The lock gives information about opened status to the server and the server can proxy it to the mobile application, where end-user can see on user information that the lock is in opened status. In case of a failure, the lock can notify the server and the server can notify the mobile application, where the end-user can see the reason for the failure.

In case of a courier inserting a parcel and the end-user is taking it out, the courier has a separate mobile application for accessing the lock and inserting the parcel into the end-user's compartment. If the end-user is close to compartment, then the courier can open the mobile application and the mobile application establishes Bluetooth® connection with the lock and displays it in the application if parameters match with what the mobile application expects. The end-user sees the lock in list and the courier sees the address of the compartment and is now able to identify that he/she is in correct place. The courier selects item, opens the lock and puts parcel into the compartment. Once the mobile application gives command to the lock to open, the server can check if this courier has rights to open it. If everything checks out, then the lock can be opened. All couriers need to be added under the service provider from where parcel has ordered. The service provider needs to make sure that this courier is listed and has proper rights. The end-user needs to make sure that this service provider is allowed to open this lock. This can be done in the end-user's mobile application on user's management side. If the courier opens the lock following actions can be done: The lock can save opening data (who, when, where) to its own memory and send it as soon as possible to the server. From that point the end-user gets notification about the delivered parcel. The lock can save to its memory that the compartment door is in opened status. This is needed for giving notification if the courier moves away from the compartment and has not closed the door correctly. If the courier moves away and the door is open, the lock can determine that the courier application has no Bluetooth® connection with the lock anymore and gives alert to the server. The server can send a notification to the courier's mobile phone that the door was not closed, and the courier should go back. Once the courier goes back and closes the door, the lock can remove the alert from the memory. For the courier, delivery process ends with closing the door of the compartment. As the end-user was notified about the delivered parcel he/she can go to the compartment and now has two separate options for getting the parcel out: she/he can open the lock with mobile application or the he/she can open the lock with a keyfob. In using the keyfob when the user is near the lock, the lock is opened over Bluetooth® connection. If the user is near the lock (typically in range of 15-25 meters), the user takes the keyfob and presses button on it. The keyfob can be waken up and it starts sending out data for the lock to pick it up. As the keyfob is already paired with the specific lock then only this lock can recognize data sent out from the keyfob. Once the lock gets data from the keyfob, it validates it and then opens the lock. There can be feedback from the lock if opening was not successful or some error came up. The lock can notify with sound. Alternatively, the user can open the lock with RFID, NFC or ISM fob.

Figure 21:
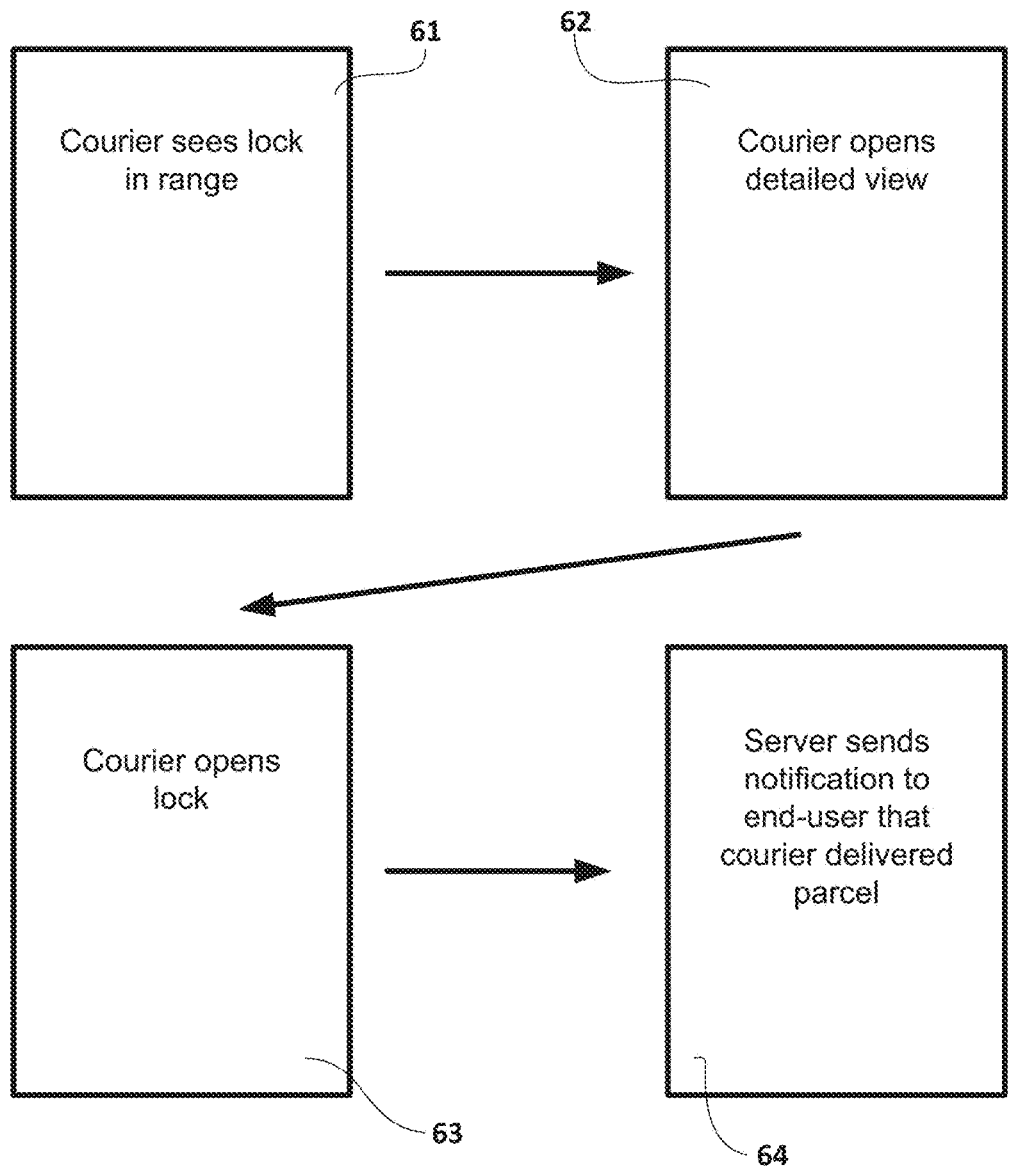
FIG. 21 shows schematically an example of a courier main flow of putting a parcel into a parcel box.

In FIG. 21 is shown an example of a courier main flow of a mobile application for the lock 10, when delivering and putting a parcel into a parcel box. In the first stage 61 the courier sees the lock 10 in range and then in the next stage 62 opens a detail view, where in the following stage 63 the courier opens the lock 10 and then in the end stage 64 the server sends notification to the end-user that the courier has delivered or picked up a parcel.

Figure 22:
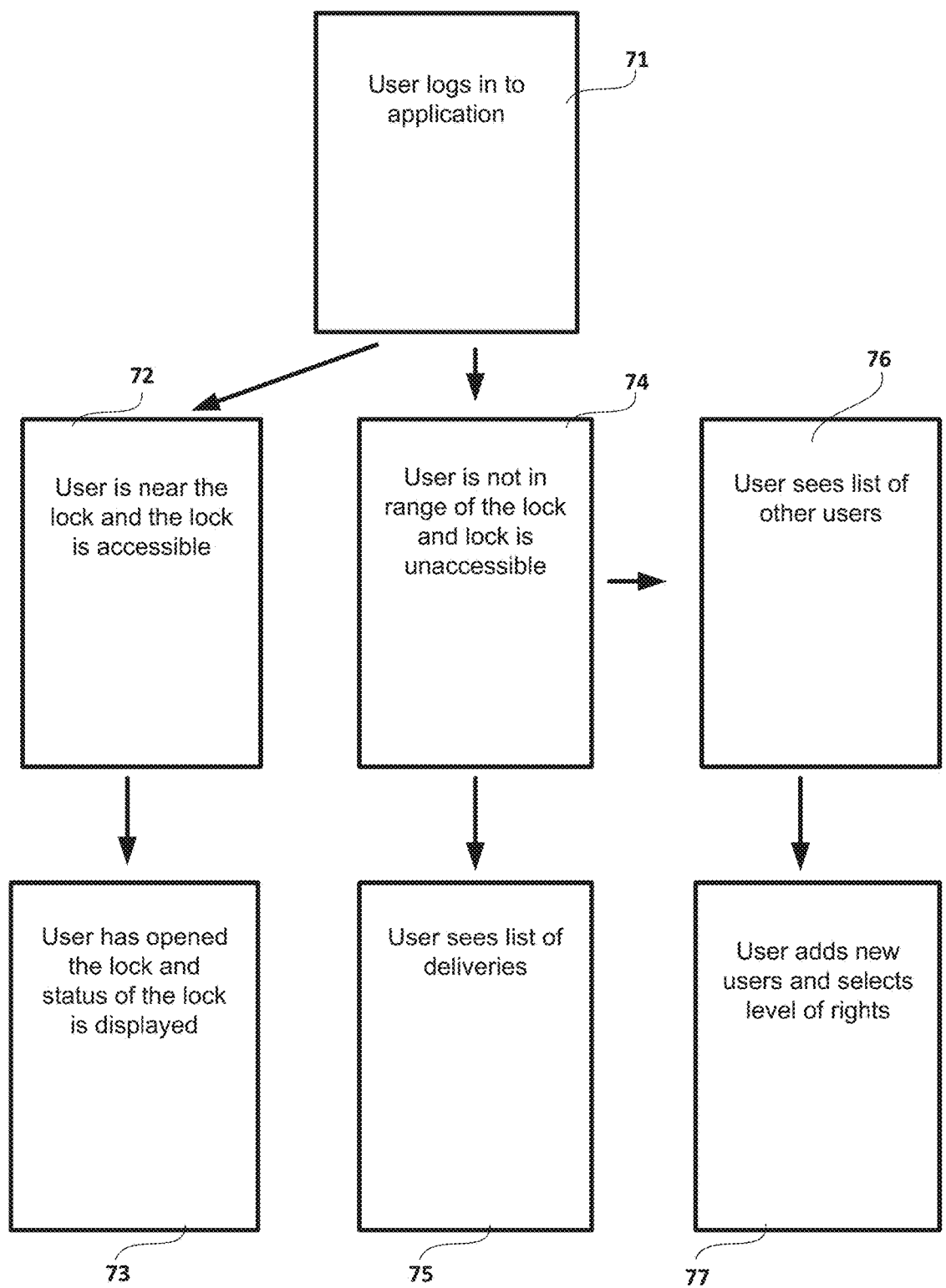
FIG. 22 shows schematically an example of an end-user main flow for getting a parcel out and for adding users.

In FIG. 22 is shown an example of an end-user main flow for getting a parcel out and for adding users for a mobile application for the lock 10. When getting a parcel out in the first stage 71 the user logs into the application in his/her mobile phone, in the following stage 72 the user is near the lock 10 and the lock 10 is accessible and at the end stage 73 the user has opened the lock 10 and status of the lock 10 is displayed in the application. When the user logs in the mobile application in first stage 71 but is not in range of the lock 10 and the lock 10 is not accessible, in stage 74, the user in stage 75 sees the list of deliveries or in stage 76 sees the list of other users and in stage 77 can add new users and select level of user rights for the users.

In FIG. 23 is shown an example of a courier operation flow chart. When a courier approaches the lock 10, he/she has two options to open the lock 10. The lock 10 can be opened by an opened mobile application and the application makes a query to the server to check the courier's rights. In case the courier has the rights, the courier presses the button and the application sends opening information to the lock 10 over a Bluetooth® connection and the lock 10 opens. Once the courier has pressed the physical button on the lock, a controller will wake up and wakes up all lock modules and sets up a query to send to the server. The query contains date/time and a question to the server whether there is free opening saved on the server side or not. The controller gives query to a network module (e.g. a 2G, 4G, Wi-Fi or NB-IoT module) and it sends it to the server. If the server will respond that there is one free opening saved to the server side (can be done from the mobile application in case the owner waits someone who has no access but needs to open the lock one time only) then the controller gives power for a motor to start moving into point where the lock will open.

If the courier does not have the rights, she/he might have the second option to open the lock 10. The lock 10 can also be opened by pressing a button on the lock 10, where after the lock makes a query to the server over wireless connection, for example over network module. The server gives free opening of the lock 10 and the lock 10 opens. If the server does not give the free opening, the lock can make an error sound and the courier might have the other option. When the lock 10 is opened the lock 10 saves the opening information to a memory and sends it to the server over wireless connection, for example network module such as 2G, 4G, 5G, Wi-Fi or NB-IoT. When the lock 10 is closed by the courier the lock can notify the server that the lock 10 is closed. The courier will close physically the door of the compartment. The lock can have a sensor that will measure if a striking plate with a magnet is near the sensor.

Figure 23A:
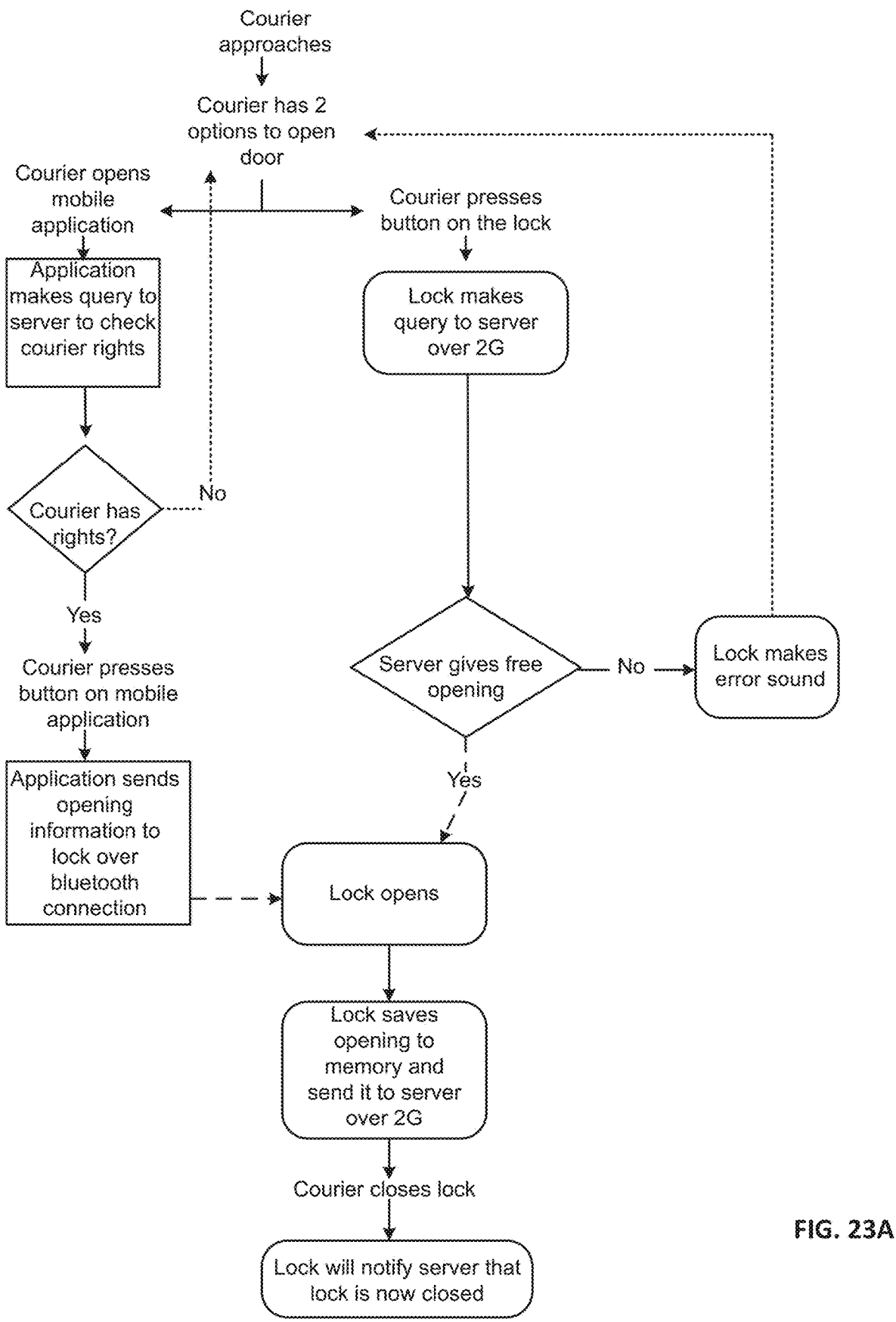
FIG. 23a shows schematically an example of a courier operation flow chart.
Figure 23B:
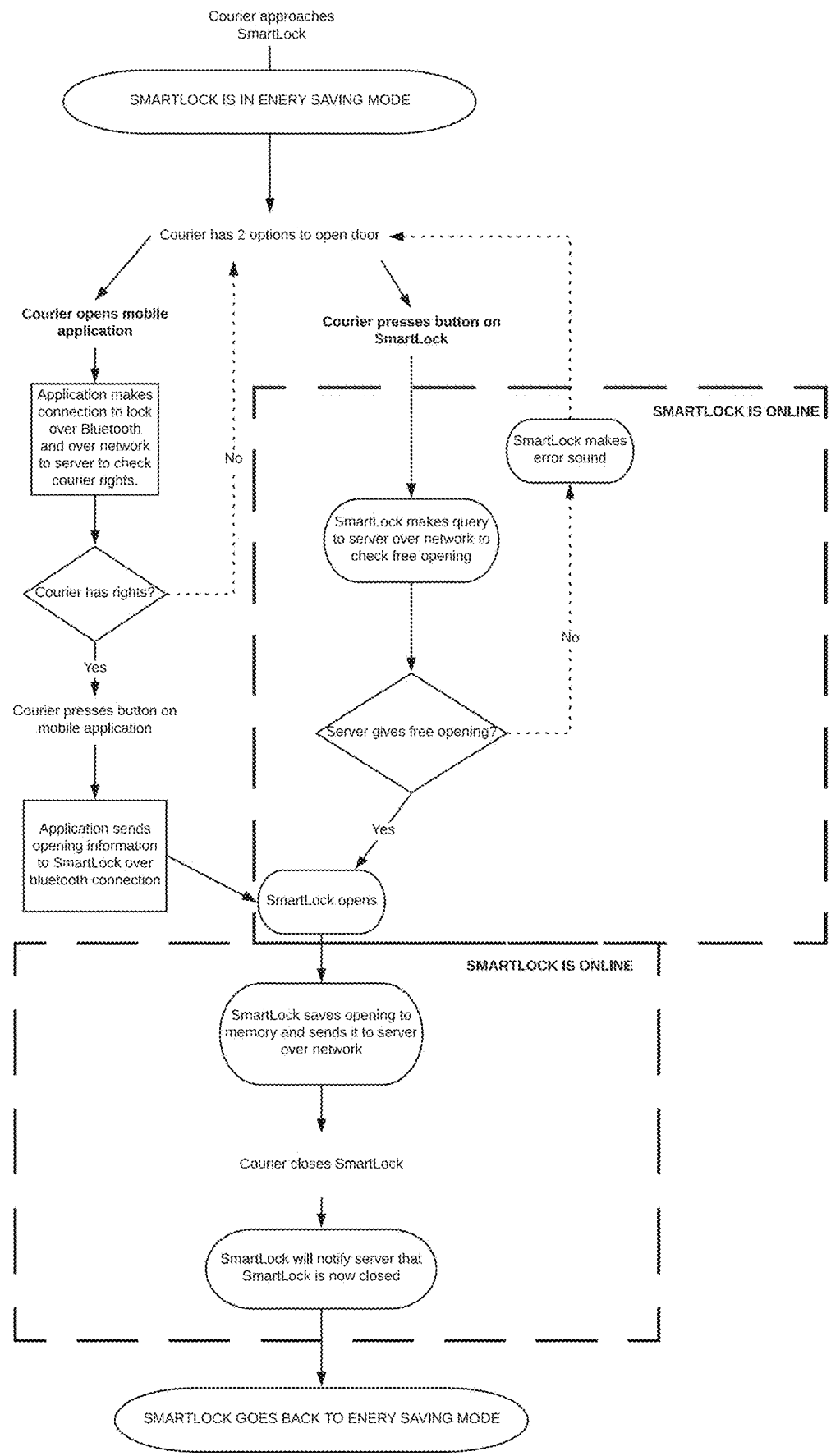
FIG. 23b shows schematically an example of the courier operation flow chart when the lock is initially on energy saving mode.

FIG. 23a shows schematically an example of a courier operation flow chart.

Figure 24A:
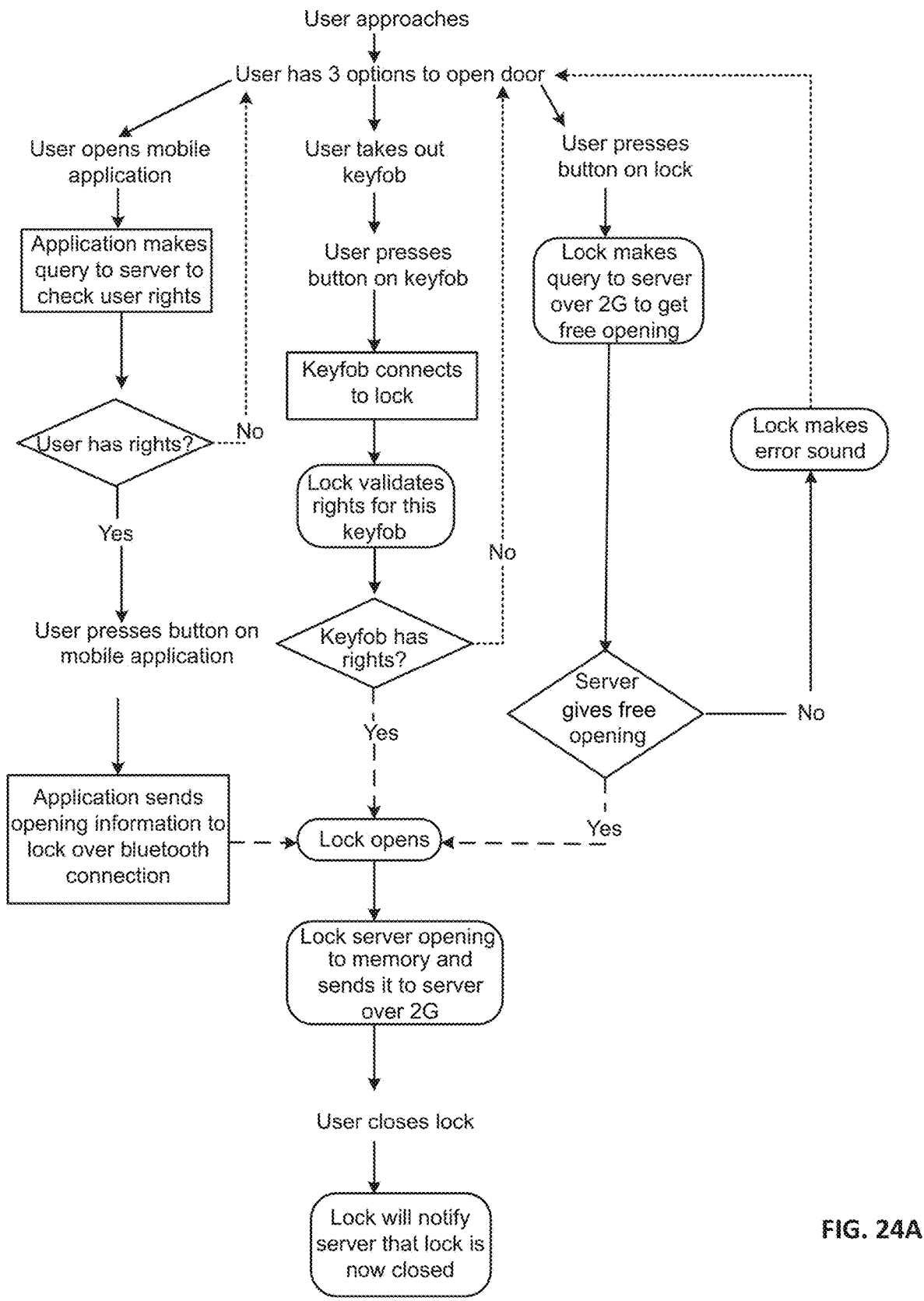
FIG. 24a shows schematically an example of an end-user operation flow chart.

FIG. 24a shows schematically an example of an end-user operation flow chart. When the user approaches, there is three options to open the lock 10. In the first option the user opens the mobile application. The application makes a query to the server to check user rights. If there are user rights, the user presses button on the mobile application and the application sends opening information to the lock 10 over a wireless communication connection such as Bluetooth® connection and opens the lock 10. If not, there might another of the three options possible. In the second option the user takes out an RFID, ISM or NFC keyfob and presses button on the keyfob, which connects to the lock 10. If the keyfob has the rights, the lock 10 opens. If not, there might be another of the three options available. In the third option the user presses a button on the lock 10 and the lock 10 makes a query to the server over wireless connection, for example a network module, to get free opening. The server gives free opening of the lock 10 and the lock 10 opens. If the server does not give the free opening of the lock, it can make an error sound and the courier might have the other option. When the lock 10 is opened the lock 10 saves the opening information to a memory and sends it to the server over wireless connection, for example a network module. When the lock 10 is closed by the courier the lock can notify the server that the lock 10 is closed.

The lock 10 has also several notifying functions: the lock 10 can notify if the door 50 is opened, the lock 10 can notify if door 50 is not closed in specified time range, the lock 10 can notify if battery level of the rechargeable battery 26 is low, the lock 10 can notify if user with no access wants to open the door 50, the lock 10 can notify if courier delivers a package. The lock 10 can also react, if some actions are initiated on the server side, right away and do needed action. If some data is needed to send out from the lock 10 to the server, it is possible right away as connection between the lock 10 and the server is established, when the lock 10 is set to operation.

If the user opens the mobile application, then it will start looking for MAC (Media Access Control) address advertised by the lock controller over a Bluetooth® channel. The lock is always advertising its own MAC address, so that the mobile application could pick it up at any time. If the mobile application has found a matching MAC address, then the mobile application will connect to the lock over Bluetooth® channel. If there are no matching MAC addresses, the mobile application will ignore others and user will not see any in the lock application. When the mobile application has found MAC address which is also saved to the user's profile (the user is signed in to the application and data about saved MACs of locks are fetched from the server after the mobile application is opened). The lock controller generates a random key (MD5), gives the random key value to mobile over Bluetooth® channel, then the mobile application creates new key called HMAC-MD5 (hash-based message authentication code—is a specific type of message authentication code (MAC) involving a cryptographic hash function and a secret cryptographic key) which is combination of a MAC-address and a random key. If HMAC-MD5 key is created on the mobile application side, then it will be sent over Bluetooth channel to the lock controller. At the same time the lock controller has also created HMAC-MD5 key on its own side. If those are matching, then the lock controller gives power for the motor to start moving into point where the lock will open. The lock controller will send data about status of lock to the mobile application over Bluetooth® channel. Now user can see green button in mobile application the user identification, which means that the is connected to the mobile application. As the generated keys are matching and the successful connection is already established, the lock controller gives power for the motor to start moving into point where the lock will open.

If the keyfob is already paired, the keyfob Bluetooth® chip has the MAC-address of the paired lock on it. Now the keyfob "knows" that this MAC-address is related to the correct lock. If user presses the button on the keyfob, the Bluetooth® chip on the keyfob is waken up. The Bluetooth® chip on the keyfob will start looking for the MAC address advertised by the lock. The lock is always advertising its own MAC-address, so that the keyfob could pick it up at any time. If the keyfob has found the matching MAC address, then the keyfob will connect to it over the Bluetooth® channel. If the keyfob will not find correct MAC-address, it will not do anything. The lock controller generates a random key (MD5), gives the random key value to the keyfob over Bluetooth®, then the keyfob creates new key called HMAC-MD5 (hash-based message authentication code—is a specific type of message authentication code (MAC) involving a cryptographic hash function and a secret cryptographic key) which is combination of the MAC-address and the random key. If HMAC-MD5 key is created on the keyfob's side, then it will be sent over the Bluetooth® channel to the lock. At the same time the lock controller has also created HMAC-MD5 key on its own side. If those are matching, then the lock controller gives power for the motor to start moving into point where the lock will open. The keyfob will disconnect right after HMAC-MD5 is send to the lock. If the lock will not get it, then the lock will not open. The user has to try again by pressing the button on the keyfob.

Once user has pressed the physical button on the lock, the controller will wake up, wakes up all lock modules and sets up a query to send to the server. The query contains date/time and the question to server if there is a free opening saved on the server side or not. The controller gives the query to a network module and it sends it to the server. If the server will respond that there is one free opening saved to the server side (can be done from the mobile application in case owner waits someone who has no access but needs to open the lock one time only) then the controller gives power for the motor to start moving into point where the lock will open. If the server will respond with error, meaning that there is no free opening left for unknown user then the controller will give command to a speaker or like to make error buzzing noise. The lock will not open.

Figure 24B:
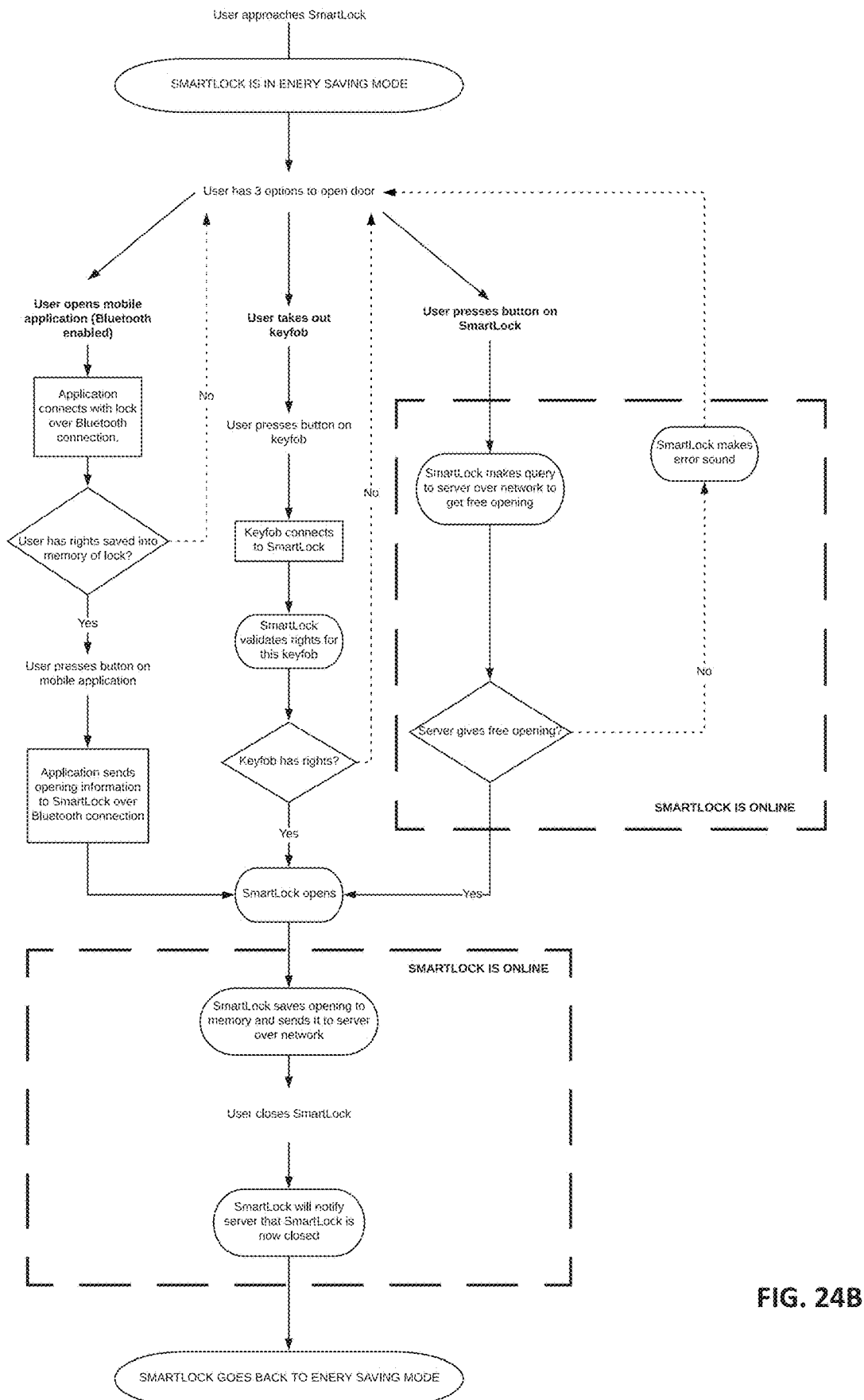
FIG. 24b shows schematically an example of the end-user operation flow chart when the loc is initially on energy saving mode.

The lock may also have an energy saving mode which is enabled by controller of the lock once battery level is below 3.3 volts. Energy saving mode means that the lock is partly functional—the network module is turned off, but other functions still work. In the energy saving mode the lock is accessible over short range radio technology e.g. via Bluetooth® connection. Lock will come back to online mode once battery level is more than 3.3 volts or someone opens lock with mobile application or keyfob. Lock will come to online also in after every 6 hours from last time being online. Lock will not be possible to open remotely over the internet when in energy saving mode. For opening lock remotely user has to use button on the lock. The following explains how energy saving mode works in specific situations; reference is made to FIGS. 23b and 24b:

User/courier opens lock or mail comes in: once user/courier has opened the lock or mail comes in then the controller of the lock will save date related to the opening i.e. who opened and when) to the memory of the lock and then will send signal to the network module to wake it up. Once the network module is up and running, the controller will use it to send data about opening action to the server. If there is more data (battery level information etc.) then the controller will send this information also to the server. The server will receive data from the controller and save it to a database. The server will notify users who have notifications enabled about the opening action. Same steps occur when the mailbox is opened. Once the data is sent to the server and the door is closed, the controller will turn off the network module in few minutes, e.g. about 3 minutes.

Battery level and charging data in every 6 h: controller will save battery level and charging data to controller's memory for example in every hour. After for example 6 hours of logging this data, the controller will send a signal to the network module to wake it up. Once the network module is up and running, the controller will use it to send data to the server. The server will receive the data from the controller and save it to a database. Once the data is sent to the server and the door is closed the controller will turn off the network module in few minutes, e.g. 3 minutes.

Opening remotely: user has option in mobile application to activate opening from a physical button on lock. When pressing an activation button in the mobile application, a query is sent to the server and now the server knows that once someone clicks on the physical button on the lock it can be opened. When another user on-site will now press the physical button on the lock then the controller will send a signal to the network module to wake up the lock. Once the network module is up and running, the controller will use it to ask from the server rights to open the lock when pushing button on lock. If the server gives the right to open lock then the controller gives a command to the motor to open the lock. Once the lock is opened then data is sent to the server. After the door is closed the controller will turn off the network module in few minutes, e.g. 3 minutes. In the energy saving mode this is the only way for the user to open lock remotely for another other user on-site next to lock.

Above only some advantageous examples of the invention have been described to which examples the invention is not to be narrowly limited and many modifications and alterations are possible within the invention. It should be noted that the features of the above examples can be combined with each other. In the description in the foregoing, although some functions have been described with reference to certain features, those functions may be performable by other features whether described or not. Although features have been described with reference to certain embodiments or examples, those features may also be present in other embodiments or examples whether described or not. Above the invention has been described by referring to some advantageous examples only to which the invention is not to be narrowly limited. Many modifications and alterations are possible within the inventive idea.

ELEMENT LIST 10 lock
11 lock body
12 front face plate
13 solar panel
14 cellular antenna
15 lock body shell
16 lock base
17 handle-cover
18 handle-body
18a extension element
19 handle axle
20 deadbolt
21 handle-blocker
22 rack
23 geared motor
24 handle opening torsion spring
25 blocker retraction spring
26 rechargeable battery
27 PCB (Printed circuit board)
28 snap action switch
29 switch plunger
30 limit switches
31 strike plate
32 magnet
33 slide
34 hall sensor
35 pinion
36 LED
37 outer thread
38 connection to solar panel
39 network module
50 door
61 first stage
62 next stage
63 following stage
64 end stage
71 first stage
72 following stage
73 end stage
74 stage
75 stage
76 stage
77 stage

What is claimed is:

1. A locking device for a door of a parcel box, comprising:
a lock body housing a lock mechanism and having a threaded outer surface for mounting the locking device to the door;
a user operable handle having an open and a closed position and allowing gripping the handle for opening the door when the handle is in the open position,
the user operable handle comprising a handle-body and a lock controller comprising a printed circuit board (PCB)-assembly having all elements for controlling the lock mechanism;

wherein
the lock mechanism comprises a motor configured to rotate a pinion configured to move a rack attached to a handle-blocker and to a deadbolt, wherein
the handle-blocker is configured to control transition of the handle between the open and closed positions due to a movement by the rack, and the deadbolt is configured to simultaneously move between a locking position and an unlocking position due to the movement of the rack, and wherein
in the closed position of the handle, the handle-blocker and the handle-body have a linear connection with each other and the deadbolt is extended to the locking position, and in the open position of the handle, the handle-blocker and the handle-body do not have the linear connection and the deadbolt is retracted to the unlocking position.

2. The locking device according to claim 1, wherein the locking device comprises an opening torsion spring configured to open the handle upon the handle-body and the handle-blocker losing the linear connection.

3. The locking device according to claim 1, wherein the handle-body has an extension element, and the linear connection is formed between the extension element and the handle-blocker.

4. The locking device according to claim 1, wherein the locking device further comprises at least one solar panel for energy supply as an internal part of the locking device or assembled separately of the locking device.

5. The locking device according to claim 1, wherein the locking device comprises a cellular antenna for data communication.

6. The locking device of claim 5, wherein a handle-body cover protects the cellular antenna.

7. The locking device of claim 1, wherein the motor is activated by activating the lock controller by tapping the handle, via short range radio technology, via near-field communication (NFC), via radio frequency identification (RFID) or remotely by connection via a mobile application.

8. The locking device of claim 1, wherein the lock is capable of receiving information related to conditions inside the parcel box from sensors in the parcel-box and optionally saving the information into a memory and communicating the information to a server connected to the locking device.

9. The locking device of claim 1, wherein the locking device is capable of receiving information related to opening and closing status of the door from a sensor communicatively connected to the lock controller and located inside the locking device.

10. The locking device according to claim 9, wherein the sensor inside the locking device is a Hall sensor and the lock is locked upon the sensor detecting a magnetic field upon the lock moving near a magnetized strike plate.

11. A locking method for a parcel box comprising the steps of:
attaching the locking device according to claim 9 onto a door of a parcel box;
closing the door by a user of the parcel box;
detecting by the sensor inside the locking device that the door is in closed position;
receiving by the lock controller information of the closed position of the door;
causing the controller based on the received information to activate the motor;
causing the motor to rotate and move the rack via rotation of the pinion and causing movement of the deadbolt to the closing position and simultaneously moving the handle-blocker to become to linear contact with the handle-body, and
causing the handle to rotate into the closed position.

12. The locking device according to claim 1, wherein the device comprises a front face plate.

13. A method to operate opening and closing a parcel box lockable with the locking device according to claim 1, the method comprising the steps of:
a) an end-user having a user software opening an account on a software for the locking device;
b) the end-user pairing the locking device with one or more users having the user software;
c) providing a mode recognizing a user and the locking device paired with the user at a time the user enters the user software;
d) allowing the software application to make a query to a server to check user rights;
e) opening the locking device when the user rights are confirmed and inserting a parcel into the parcel box or removing a parcel from the parcel box and closing the door by the user;
f) recognizing the door being closed and signaling the controller to lock the locking device by a sensor communicatively connected to the controller and located inside the locking device; and
g) allowing the mobile application via a server to send information to the end user that the door has been opened and that the locking device is closed.

14. A method to operate opening and closing a parcel box lockable with the locking device according to claim 1, the method comprising the steps of:
a) opening an account on an end-user software for the locking device;
b) pairing the locking device with one or more users having a user software application;
c) providing a first mode recognizing one of the one or more users paired with the locking device at a time the one user enters the user software application;
d) providing a second mode recognizing one of the one or more users operating the locking device by activating a controller via physically tapping the handle of the locking device, by using an RFID (radio-frequency identification) or NFC (near-field communication) technology in the form of a card, a tag, a label, a fob, or by connection via a mobile application;
e) allowing the locking device or the mobile application to make a query to a server to check user rights in response to at least the first mode and the second mode;
f) opening the locking device when the user rights are confirmed and inserting a parcel into the parcel box or removing a parcel from the parcel box and closing the door by the user;
g) recognizing a closed state of the door and signaling the controller to lock the locking device by a sensor communicatively connected to the controller and located inside the locking device; and
h) allowing the mobile application or the locking device via a server to send information to the end-user that the door has been opened and the locking device is closed.

* * * * *